(12) United States Patent
Tian et al.

(10) Patent No.: US 11,601,967 B2
(45) Date of Patent: Mar. 7, 2023

(54) TECHNIQUES FOR SEMI-STATIC CODEBOOK DESIGN

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Zhifei Fan, San Diego, CA (US); Tao Luo, San Diego, CA (US); Wooseok Nam, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/105,456

(22) Filed: Nov. 25, 2020

(65) Prior Publication Data
US 2022/0167392 A1    May 26, 2022

(51) Int. Cl.
| | |
|---|---|
| *H04W 72/12* | (2009.01) |
| *H04W 72/14* | (2009.01) |
| *H04B 7/0417* | (2017.01) |
| *H04B 7/0456* | (2017.01) |
| *H04W 72/04* | (2023.01) |

(Continued)

(52) U.S. Cl.
CPC .......... *H04W 72/14* (2013.01); *H04B 7/0417* (2013.01); *H04B 7/0456* (2013.01);
(Continued)

(58) Field of Classification Search
CPC ... H04L 1/1854; H04L 1/1864; H04L 1/1896; H04L 1/1607; H04L 1/1812;
(Continued)

(56) References Cited

U.S. PATENT DOCUMENTS 11,082,954 B2 *   8/2021  Huang ................. H04B 7/0456
2019/0342040 A1 * 11/2019  Tiirola .............. H04W 72/1242
(Continued)

OTHER PUBLICATIONS

Huawei, et al., "HARQ Enhancement in NR Unlicensed", 3GPP Draft, R1-1911868, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019 (Nov. 9, 2019), XP051823050, 11 Pages, Retrieved from the: Internet: URL: https://ftp.3gpp.org/tsg_ran/WG1_RL1/TSGR1_99/Docs/R1-1911868.zip R1-1911868.docx [retrieved on Nov. 9, 2019] pp. 1-2.

(Continued)

*Primary Examiner* — Phuc H Tran
(74) *Attorney, Agent, or Firm* — Holland & Hart LLP

(57) ABSTRACT

Methods, systems, and devices for wireless communications are described. A user equipment (UE) may receive a grant scheduling a downlink transmission of a set of configurable downlink transmissions. The downlink transmission may include reference slots corresponding to offset values associated with one or more feedback occasions. The UE may construct a feedback codebook based on a first quantity of slots in the set of configurable downlink transmissions, a second quantity of reference slots in the set of configurable downlink transmissions, and a third quantity of configurable offset values associated with one or more feedback occasions. Based on a size of the feedback codebook, the UE may generate feedback bits for reporting whether the UE successfully received a downlink transmission in corresponding slots. In some examples, the UE may identify a slot with a symbol reserved for an uplink transmission, and skip generating a corresponding feedback bit for the identified slot.

44 Claims, 21 Drawing Sheets

(51) Int. Cl.
*H04W 72/0446* (2023.01)
*H04W 72/1263* (2023.01)

(52) U.S. Cl.
CPC ..... *H04W 72/042* (2013.01); *H04W 72/0446* (2013.01); *H04W 72/1263* (2013.01)

(58) Field of Classification Search
CPC ............ H04L 5/0055; H04W 72/1273; H04W 72/1289; H04W 72/042; H04W 72/0446
See application file for complete search history.

(56) References Cited

U.S. PATENT DOCUMENTS

2020/0322097 A1* 10/2020 Hsieh ................ H04W 72/1289
2021/0391955 A1* 12/2021 He ......................... H04L 1/1861
2022/0053535 A1* 2/2022 Xu ......................... H04L 5/0053

OTHER PUBLICATIONS

International Search Report and Written Opinion—PCT/US2021/057288—ISA/EPO—dated Feb. 24, 2022.

QUALCOMM: "Remaining Issues on DL SPS for URLLC", 3GPP Draft, R1-2002549, 3GPP TSG RAN WG1 #100b, e-Meeting, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), XP051875663, 4 Pages, Retrieved from the Internet: URL: https://ftp.3gpp.org/tsg_ran/WG1_RL1/TSGR1_100b_e/Docs/R1-2002549.zip R1-2002549 Remaining Issues on DL SPS for URLLC.docx [retrieved on Apr. 11, 2020] pp. 3, 4.

Zte, et al., "Remaining Issues on Scheduling and HARQ for NR-U", 3GPP Draft, R1-1911824, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823018, pp. 1-11, Retrieved from the Internet: URL:https://ftp.3gpp.org/tsg_ran/WG1_RL1/TSGR1_99/Docs/R1-1911824.zip R1-1911824 Remaining issues on scheduling and HARQ for NR-U.docx [retrieved on Nov. 9, 2019] pp. 3-4.

* cited by examiner

TECHNIQUES FOR SEMI-STATIC CODEBOOK DESIGN

INTRODUCTION

The following relates generally to wireless communications, and more specifically to codebook design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving, from a base station, one or more grants, a grant of the one or more grants scheduling a downlink transmission, one or more reference slots of the downlink transmission each corresponding to a respective offset value associated with a feedback occasion of one or more feedback occasions. The method may further include transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

An apparatus for wireless communications at a UE is described. The apparatus may include a processor and memory coupled to the processor. The processor and memory may be configured to receive, from a base station, one or more grants, a grant of the one or more grants scheduling a downlink transmission, one or more reference slots of the downlink transmission each corresponding to a respective offset value associated with a feedback occasion of one or more feedback occasions. The processor and memory may be further configured to transmit one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

Another apparatus for wireless communications at a UE is described. The apparatus may include means for receiving, from a base station, one or more grants, a grant of the one or more grants scheduling a downlink transmission, one or more reference slots of the downlink transmission each corresponding to a respective offset value associated with a feedback occasion of one or more feedback occasions. The apparatus may further include means for transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

A non-transitory computer-readable medium storing code for wireless communications at a UE is described. The code may include instructions executable by a processor to receive, from a base station, one or more grants, a grant of the one or more grants scheduling a downlink transmission, one or more reference slots of the downlink transmission each corresponding to a respective offset value associated with a feedback occasion of one or more feedback occasions. The code may further include instructions executable by a processor to transmit one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

Some examples of the method, apparatuses, and non-transitory computer-readable medium described herein may further include operations, features, means, or instructions for receiving control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, where the size of the feedback codebook may be further based on the received control information.

Some examples of the method, apparatuses, and non-transitory computer-readable medium described herein may further include operations, features, means, or instructions for identifying the one or more configurable downlink transmissions based on the received control information, where the one or more configurable downlink transmissions include the downlink transmission.

In some examples of the method, apparatuses, and non-transitory computer-readable medium described herein, the one or more configurable downlink transmissions include one or more groups of slots, a respective last slot of each group of slots including a respective reference slot.

Some examples of the method, apparatuses, and non-transitory computer-readable medium described herein may further include operations, features, means, or instructions for refraining from monitoring for a configurable downlink transmission including a first one or more groups of slots based on identifying a first indicator value associated with the configurable downlink transmission that overlaps with a first one or more symbols reserved for a first uplink transmission in a slot of the first one or more groups of slots of the configurable downlink transmission.

Some examples of the method, apparatuses, and non-transitory computer-readable medium described herein may further include operations, features, means, or instructions for initiating a set of slots, where the set of slots may be initially empty, identifying a reference slot of a second one or more reference slots based on the third quantity of configurable offset values and the feedback occasion, updating the set of slots based on identifying the reference slot, where the updated set of slots include a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot may be a last slot of the first group of slots of the first quantity of slots, and generating a respective feedback bit for each slot of the updated set of slots, where the one or more feedback bits transmitted in the feedback occasion include the generated feedback bits.

Some examples of the method, apparatuses, and non-transitory computer-readable medium described herein may further include operations, features, means, or instructions for identifying a first reference slot of a first group of slots of the downlink transmission based on receiving the grant, the first reference slot corresponding to a first offset value associated with the feedback occasion of the one or more feedback occasions, where the feedback occasion may be a first feedback occasion and identifying a second reference slot of a second group of slots of the downlink transmission based on receiving the grant, the second reference slot corresponding to a second offset value associated with a second feedback occasion of the one or more feedback occasions.

Some examples of the method, apparatuses, and non-transitory computer-readable medium described herein may further include operations, features, means, or instructions for initiating a first set of slots and a second set of slots, where the first set of slots and the second set of slots may be initially empty, identifying a third reference slot of a second one or more reference slots based on the third quantity of configurable offset values and the first feedback occasion, identifying a fourth reference slot of a third one or more reference slots based on the third quantity of configurable offset values and the second feedback occasion, updating the first set of slots based on identifying the third reference slot, where the updated first set of slots include a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot may be a last slot of the third group of slots of the first quantity of slots, updating the second set of slots based on identifying the fourth reference slot, where the updated second set of slots include a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot may be a last slot of the fourth group of slots of the first quantity of slots, generating a first respective feedback bit for each slot of the updated first set of slots, where the first generated feedback bits may be transmitted in the first feedback occasion, and generating a second respective feedback bit for each slot of the updated second set of slots, where the second generated feedback bits may be transmitted in the second feedback occasion.

Some examples of the method, apparatuses, and non-transitory computer-readable medium described herein may further include operations, features, means, or instructions for refraining from monitoring for a configurable downlink transmission in a first slot of a first group of slots of the configurable downlink transmission based on identifying a first indicator value associated with the configurable downlink transmission that overlaps with a first one or more symbols reserved for a first uplink transmission in the first slot of the first group of slots of the configurable downlink transmission.

Some examples of the method, apparatuses, and non-transitory computer-readable medium described herein may further include operations, features, means, or instructions for initiating a set of slots, where the set of slots may be initially empty, identifying a reference slot of a second one or more reference slots based on the third quantity of configurable offset values and the feedback occasion, updating the set of slots based on identifying the reference slot, where the updated set of slots include a second group of slots of the first quantity of slots in the one or more configurable downlink transmissions and the identified reference slot may be a last slot of the second group of slots of the first quantity of slots, refraining from adding, to the updated set of slots, a second slot of the second group of slots of the first quantity of slots based on identifying a second indicator value associated with the one or more configurable downlink transmissions that overlaps with a second one or more symbols reserved for a second uplink transmission in the second slot of the second group of slots, and generating a respective feedback bit for each slot of the updated set of slots, where the one or more feedback bits transmitted in the feedback occasion include the generated feedback bits.

Some examples of the method, apparatuses, and non-transitory computer-readable medium described herein may further include operations, features, means, or instructions for identifying a first reference slot of a second group of slots of the downlink transmission based on receiving the grant, the first reference slot corresponding to a first offset value associated with the feedback occasion of the one or more feedback occasions, where the feedback occasion may be a first feedback occasion and identifying a second reference slot of a third group of slots of the downlink transmission based on receiving the grant, the second reference slot corresponding to a second offset value associated with a second feedback occasion of the one or more feedback occasions.

Some examples of the method, apparatuses, and non-transitory computer-readable medium described herein may further include operations, features, means, or instructions for initiating a first set of slots and a second set of slots, where the first set of slots and the second set of slots may be initially empty, identifying a third reference slot of a second one or more reference slots based on the third quantity of configurable offset values and the first feedback occasion, identifying a fourth reference slot of a third one or more reference slots based on the third quantity of configurable offset values and the second feedback occasion, updating the first set of slots based on identifying the third reference slot, where the updated first set of slots include a fourth group of slots of the first quantity of slots in the one or more configurable downlink transmissions and the identified third reference slot may be a last slot of the fourth group of slots of the first quantity of slots, updating the second set of slots based on identifying the fourth reference slot, where the updated second set of slots include a fifth group of slots of the first quantity of slots in the one or more configurable downlink transmissions and the identified fourth reference slot may be a last slot of the fifth group of slots of the first quantity of slots, refraining from adding, to the updated first set of slots, a second slot of the fourth group of slots of the first quantity of slots based on identifying a second indicator value associated with the one or more configurable downlink transmissions that overlaps with a second one or more symbols reserved for a second uplink transmission in the second slot of the fourth group of slots, refraining from adding, to the updated second set of slots, a third slot of the fifth group of slots of the first quantity of slots based on identifying a third indicator value associated with the one or more configurable downlink transmissions that overlaps with a third one or more symbols reserved for a third uplink transmission in the third slot of the fifth group of slots, generating a first respective feedback bit for each slot of the updated first set of slots, where the first generated feedback bits may be transmitted in the first feedback occasion, and generating a second respective feedback bit for each slot of the updated second set of slots, where the second generated feedback bits may be transmitted in the second feedback occasion.

A method for wireless communications at a base station is described. The method may include transmitting, to a UE, one or more grants, a grant of the one or more grants scheduling a downlink transmission, one or more reference slots of the downlink transmission each corresponding to a respective offset value associated with a feedback occasion of one or more feedback occasions. The method may further include receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

An apparatus for wireless communications at a base station is described. The apparatus may include a processor and memory coupled to the processor. The processor and memory may be configured to transmit, to a UE, one or more grants, a grant of the one or more grants scheduling a downlink transmission, one or more reference slots of the downlink transmission each corresponding to a respective offset value associated with a feedback occasion of one or more feedback occasions. The processor and memory may be further configured to receive one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

Another apparatus for wireless communications at a base station is described. The apparatus may include means for transmitting, to a UE, one or more grants, a grant of the one or more grants scheduling a downlink transmission, one or more reference slots of the downlink transmission each corresponding to a respective offset value associated with a feedback occasion of one or more feedback occasions. The apparatus may further include means for receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

A non-transitory computer-readable medium storing code for wireless communications at a base station is described. The code may include instructions executable by a processor to transmit, to a UE, one or more grants, a grant of the one or more grants scheduling a downlink transmission, one or more reference slots of the downlink transmission each corresponding to a respective offset value associated with a feedback occasion of one or more feedback occasions. The code may further include instructions executable by a processor to receive one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

Some examples of the method, apparatuses, and non-transitory computer-readable medium described herein may further include operations, features, means, or instructions for transmitting control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, where the size of the feedback codebook may be further based on the transmitted control information.

Some examples of the method, apparatuses, and non-transitory computer-readable medium described herein may further include operations, features, means, or instructions for identifying the one or more configurable downlink transmissions based on the transmitted control information, where the one or more configurable downlink transmissions include the downlink transmission.

In some examples of the method, apparatuses, and non-transitory computer-readable medium described herein, the downlink transmission includes one or more groups of slots, a respective last slot of each group of slots including a respective reference slot of the one or more reference slots.

Some examples of the method, apparatuses, and non-transitory computer-readable medium described herein may further include operations, features, means, or instructions for refraining from scheduling a configurable downlink transmission including a first one or more groups of slots based on identifying a first indicator value associated with the configurable downlink transmission that overlaps with a first one or more symbols reserved for a first uplink transmission in a slot of the first one or more groups of slots of the configurable downlink transmission.

Some examples of the method, apparatuses, and non-transitory computer-readable medium described herein may further include operations, features, means, or instructions for initiating a set of slots, where the set of slots may be initially empty, identifying a reference slot of a second one or more reference slots based on the third quantity of configurable offset values and the feedback occasion, updating the set of slots based on identifying the reference slot, where the updated set of slots include a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot may be a last slot of the first group of slots of the first quantity of slots, and monitoring for a respective feedback bit for each slot of the updated set of slots, where receiving the one or more feedback bits in the feedback occasion may be based on the monitoring.

Some examples of the method, apparatuses, and non-transitory computer-readable medium described herein may further include operations, features, means, or instructions for identifying a first reference slot of a first group of slots of the downlink transmission based on transmitting the grant, the first reference slot corresponding to a first offset value associated with the feedback occasion of the one or more feedback occasions, where the feedback occasion may be a first feedback occasion and identifying a second reference slot of a second group of slots of the downlink transmission based on transmitting the grant, the second reference slot corresponding to a second offset value associated with a second feedback occasion of the one or more feedback occasions.

Some examples of the method, apparatuses, and non-transitory computer-readable medium described herein may further include operations, features, means, or instructions for initiating a first set of slots and a second set of slots, where the first set of slots and the second set of slots may be initially empty, identifying a third reference slot of a second one or more reference slots based on the third quantity of configurable offset values and the first feedback occasion, identifying a fourth reference slot of a third one or more reference slots based on the third quantity of configurable offset values and the second feedback occasion, updating the first set of slots based on identifying the third reference slot, where the updated first set of slots include a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot may be a last slot of the third group of slots of the first quantity of slots, updating the second set of slots based on identifying the fourth reference slot, where the updated second set of slots include a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot may be a last slot of the fourth group of slots of the first quantity of slots, monitoring for a first respective feedback bit for each slot of the updated first set of slots, where a first one or more feedback bits may be received in the first feedback occasion may be based on the monitoring, and monitoring for a second respective feedback bit for each slot of the updated second set of slots, where a second one or more feedback bits may be received in the second feedback occasion may be based on the monitoring.

Some examples of the method, apparatuses, and non-transitory computer-readable medium described herein may further include operations, features, means, or instructions for refraining from transmitting a configurable downlink transmission in a first slot of a first group of slots of the configurable downlink transmission based on identifying a first indicator value associated with the configurable downlink transmission that overlaps with a first one or more symbols reserved for a first uplink transmission in the first slot of the first group of slots of the configurable downlink transmission.

Some examples of the method, apparatuses, and non-transitory computer-readable medium described herein may further include operations, features, means, or instructions for initiating a set of slots, where the set of slots may be initially empty, identifying a reference slot of a second one or more reference slots based on the third quantity of configurable offset values and the feedback occasion, updating the set of slots based on identifying the reference slot, where the updated set of slots include a second group of slots of the first quantity of slots in the one or more configurable downlink transmissions and the identified reference slot may be a last slot of the second group of slots of the first quantity of slots, refraining from adding, to the updated set of slots, a second slot of the second group of slots of the first quantity of slots based on identifying a second indicator value associated with the one or more configurable downlink transmissions that overlaps with a second one or more symbols reserved for a second uplink transmission in the second slot of the second group of slots, and monitoring for a respective feedback bit for each slot of the updated set of slots, where receiving the one or more feedback bits in the feedback occasion may be based on the monitoring.

Some examples of the method, apparatuses, and non-transitory computer-readable medium described herein may further include operations, features, means, or instructions for identifying a first reference slot of a second group of slots of the downlink transmission based on transmitting the grant, the first reference slot corresponding to a first offset value associated with the feedback occasion of the one or more feedback occasions, where the feedback occasion may be a first feedback occasion and identifying a second reference slot of a third group of slots of the downlink transmission based on transmitting the grant, the second reference slot corresponding to a second offset value associated with a second feedback occasion of the one or more feedback occasions.

Some examples of the method, apparatuses, and non-transitory computer-readable medium described herein may further include operations, features, means, or instructions for initiating a first set of slots and a second set of slots, where the first set of slots and the second set of slots may be initially empty, identifying a third reference slot of a second one or more reference slots based on the third quantity of configurable offset values and the first feedback occasion, identifying a fourth reference slot of a third one or more reference slots based on the third quantity of configurable offset values and the second feedback occasion, updating the first set of slots based on identifying the third reference slot, where the updated first set of slots include a fourth group of slots of the first quantity of slots in the one or more configurable downlink transmissions and the identified third reference slot may be a last slot of the fourth group of slots of the first quantity of slots, updating the second set of slots based on identifying the fourth reference slot, where the updated second set of slots include a fifth group of slots of the first quantity of slots in the one or more configurable downlink transmissions and the identified fourth reference slot may be a last slot of the fifth group of slots of the first quantity of slots, refraining from adding, to the updated first set of slots, a second slot of the fourth group of slots of the first quantity of slots based on identifying a second indicator value associated with the one or more configurable downlink transmissions that overlaps with a second one or more symbols reserved for a second uplink transmission in the second slot of the fourth group of slots, refraining from adding, to the updated second set of slots, a third slot of the fifth group of slots of the first quantity of slots based on identifying a third indicator value associated with the one or more configurable downlink transmissions that overlaps with a third one or more symbols reserved for a third uplink transmission in the third slot of the fifth group of slots, monitoring for a first respective feedback bit for each slot of the updated first set of slots, where a first one or more feedback bits may be received in the first feedback occasion may be based on the monitoring, and monitoring for a second respective feedback bit for each slot of the updated second set of slots, where a second one or more feedback bits may be received in the second feedback occasion may be based on the monitoring.

DETAILED DESCRIPTION

In some wireless communications systems, a base station may transmit a grant scheduling multiple downlink transmissions (e.g., physical downlink shared channel (PDSCH) transmissions) to a UE to reduce control overhead. The UE may monitor for the downlink transmissions based on the grant, and transmit feedback (e.g., acknowledgment (ACK) or negative ACK (NACK) feedback) based on receiving or failing to receive the scheduled transmissions. The UE may be configured to transmit feedback at identified feedback occasions, such as in a physical uplink control channel (PUCCH) transmission. The UE may transmit the feedback according to a codebook, where the codebook may be based on offset values between a slot containing the feedback occasion and a slot containing a downlink transmission. In some cases, the size of the codebook may determine the quantity of downlink transmissions that may be scheduled by a single grant. In some cases, the codebook may be semi-statically configured, for example via a Radio Resource Control (RRC) message.

In accordance with techniques disclosed herein, a UE and a base station may construct a feedback codebook for a feedback occasion (e.g., a PUCCH transmission) based on a set of configurable downlink transmissions. The set of configurable downlink transmissions may include downlink transmissions (e.g., PDSCH transmissions) the base station may potentially schedule for the UE. The UE may receive a grant scheduling slots for a downlink transmission of the set of configurable downlink transmissions. The downlink transmission may include one or more reference slots corresponding to offset values associated with one or more feedback occasions. The UE may construct a feedback codebook based on a first quantity of slots in the set of configurable downlink transmissions, a second quantity of reference slots in the set of configurable downlink transmissions, and a third quantity of configurable offset values associated with one or more feedback occasions. In some examples, the UE may receive control information (e.g., in an RRC message) identifying one or more of the quantities, where a size of the feedback codebook may be semi-statically configured based on the received control information. Based on the size of the feedback codebook, the UE may generate feedback bits for reporting whether the UE successfully received a downlink transmission in corresponding slots. In some examples, the UE may identify a slot with a symbol reserved for an uplink transmission, and skip generating a corresponding feedback bit for the identified slot.

One or more aspects of the disclosure are initially described in the context of wireless communications systems. One or more aspects of the disclosure are further illustrated by and described with reference to transmission schemes, process flows, apparatus diagrams, system diagrams, and flowcharts that relate to techniques for semi-static codebook design.

Figure 1:
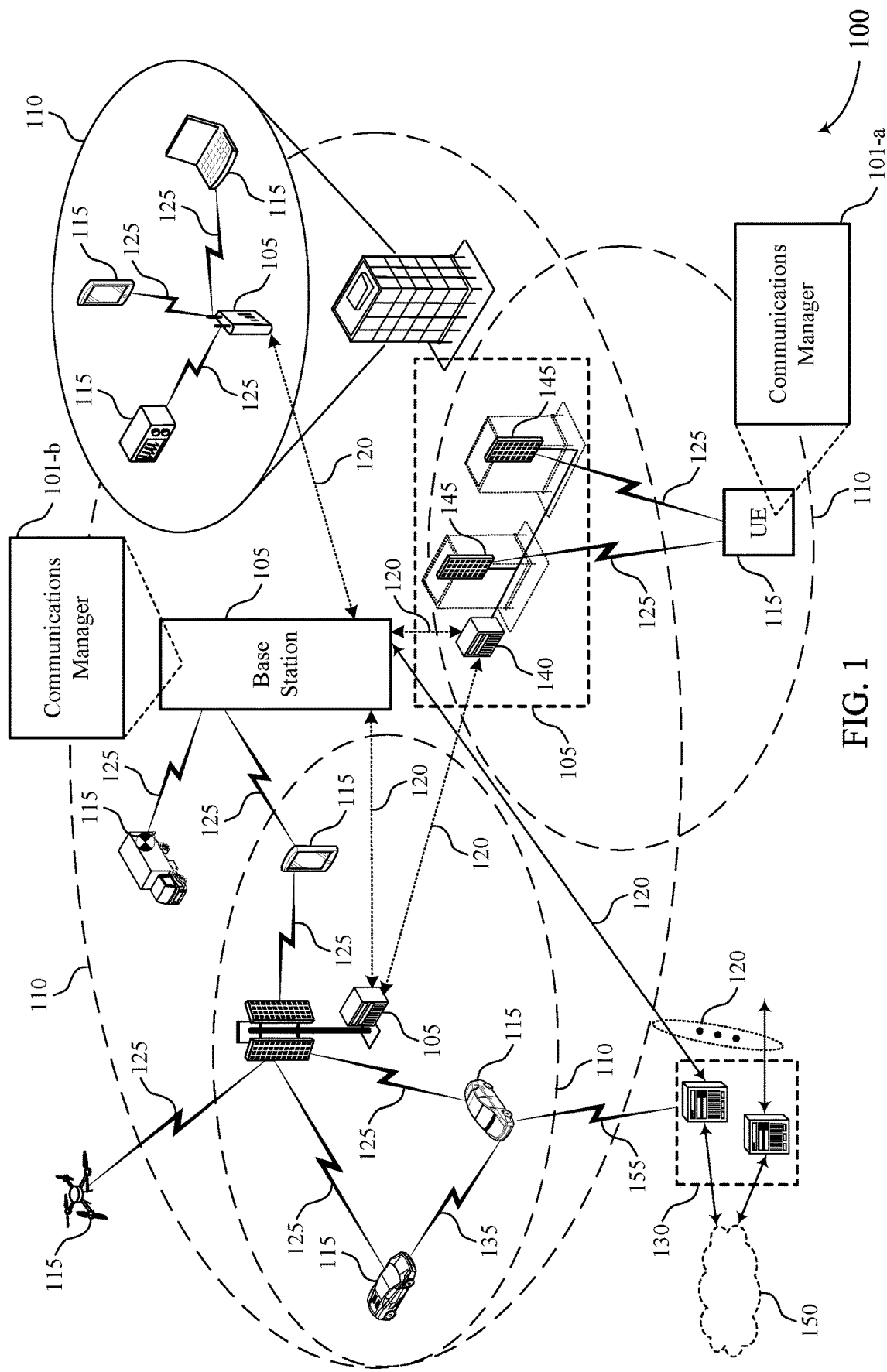
FIG. 1 illustrates an example of a wireless communications system that supports techniques for semi-static codebook design in accordance with one or more aspects of the present disclosure.

FIG. 1 illustrates an example of a wireless communications system 100 that supports techniques for semi-static codebook design in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 and a base station 105 may construct a feedback codebook for a feedback occasion (e.g., a PUCCH transmission) based on a set of configurable downlink transmissions that may be associated with the feedback occasion. The set of configurable downlink transmissions may include downlink transmissions (e.g., PDSCH transmissions) the base station may potentially schedule for the UE 115. The UE 115 may receive a grant scheduling slots for a downlink transmission of the set of configurable downlink transmissions. The downlink transmission may include one or more reference slots corresponding to offset values associated with one or more feedback occasions. The UE 115 may construct a feedback codebook based on a first quantity of slots in the set of configurable downlink transmissions, a second quantity of reference slots in the set of configurable downlink transmissions, and a third quantity of configurable offset values associated with one or more feedback occasions. In some examples, the UE 115 may receive control information identifying one or more of the quantities. Based on a size of the feedback codebook, the UE 115 may generate feedback bits for reporting to the base station 105 whether the UE 115 successfully received a downlink transmission in corresponding slots. The base station 105 may also construct the feedback codebook to effectively monitor for the feedback from the UE 115. In some examples, the UE 115 may identify a slot with a symbol reserved for an uplink transmission, and skip generating a corresponding feedback bit for the identified slot.

UEs 115 may include a UE communications manager 101-a. The UE communications manager 101-a may manage downlink grants and feedback transmissions, and in some cases may receive downlink transmissions based on the downlink grants. The UE communications manager 101-a may construct a feedback codebook based on the downlink grants, where the feedback codebook may include a quantity of feedback bits.

One or more of the base stations 105 may include a base station communications manager 101-b. The base station communications manager 101-b may generate grants scheduling downlink transmissions, and monitor for feedback based on the grants. In some cases, the base station communications manager 101-b may construct a feedback codebook based on the downlink grants, where the feedback codebook may include a quantity of feedback bits the base station communications manager 101-b may expect to receive from a UE 115.

Figure 2:
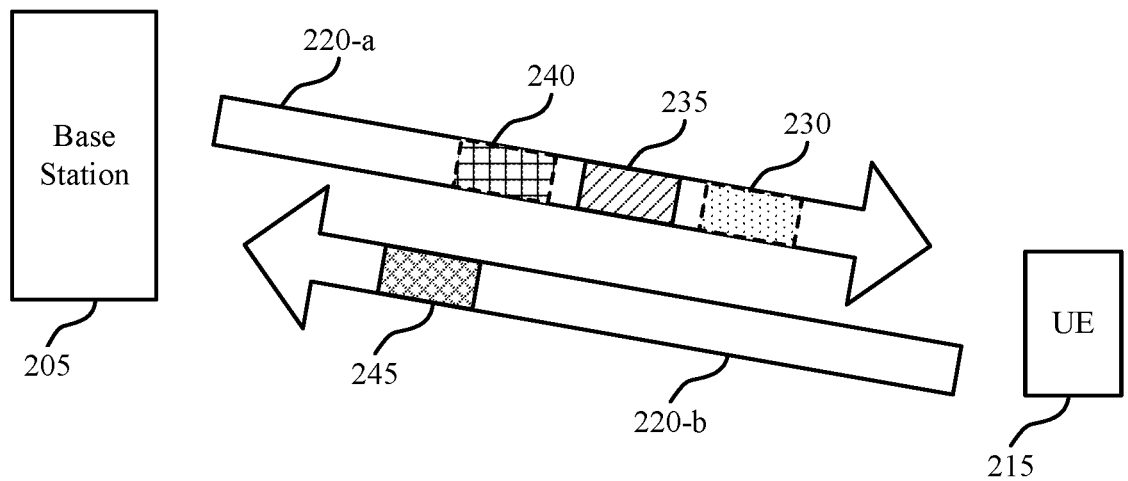
FIG. 2 illustrates an example of a wireless communications system that supports techniques for semi-static codebook design in accordance with one or more aspects of the present disclosure.
Figure 2:
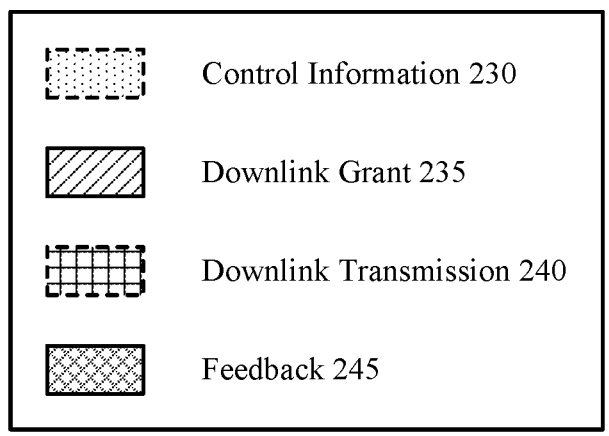

FIG. 2 illustrates an example of a wireless communications system 200 that supports techniques for semi-static codebook design in accordance with one or more aspects of the present disclosure. In some examples, the wireless communications system 200 may implement aspects of the wireless communications system 100. For example, the wireless communications system 200 may include a base station 205 and a UE 215, which may be examples of the corresponding devices described with reference to FIG. 1. The base station 205 and the UE 215 may communicate over channels 220 (e.g., a downlink channel 220-a and an uplink channel 220-b). In some examples, the base station 205 and the UE 215 may communicate over the channels 220 in frequency bands of a mmW spectrum (e.g., using frequency bands from 52.6 GHz to 70 GHz) The wireless communications system 200 may include features for improved communications reliability, among other benefits.

The base station 205 may transmit downlink grants 235 to the UE 215 scheduling downlink transmissions 240 (e.g., PDSCH transmissions). In some examples, a downlink grant 235 may schedule multiple downlink transmissions 240, where the downlink grant 235 may be referred to as a multi-PDSCH grant, which may reduce control overhead. For example, slots of the channels 220 may be shorter in the mmW spectrum than in other frequency, such as when a high sub-carrier spacing (SCS) is used for communications on the channels 220. Accordingly, a multi-PDSCH grant may enable the base station 205 to schedule a longer downlink burst compared to a single PDSCH grant.

In some examples, a downlink grant 235 may schedule multiple continuous downlink transmissions 240. Each downlink transmission 240 of the multiple continuous downlink transmissions 240 may be configured with a same frequency domain resource allocation, modulation and coding scheme (MCS), rank, and other transmission parameters. A starting and ending position of each downlink transmission 240 may be provided by a time domain resource allocation, where a time domain resource allocation may include a respective indicator value (e.g., a start and length indicator value (SLIV)) for each slot of a downlink transmission 240. For example, a SLIV may indicate a start symbol and a length (e.g., in symbols) for a downlink transmission 240 in a slot. The downlink grant 235 may indicate a first HARQ process identifier for a first downlink transmission 240 of the multiple continuous downlink transmissions 240, and the UE 215 may determine HARQ process identifiers for the remaining downlink transmissions 240 based on incrementing the indicated HARQ process identifier. Each downlink transmission 240 may be configured with a respective new data indicator (NDI) and a respective redundancy version identifier (RVID).

Based on receiving the downlink grant 235, the UE 215 may monitor for the downlink transmissions 240 and transmit feedback 245 (e.g., HARQ-ACK feedback) based on receiving or failing to receive the scheduled downlink transmissions 240. The UE 215 may be configured to transmit the feedback 245 at identified feedback occasions, such as in a PUCCH transmission. The UE 215 may transmit the feedback 245 according to a codebook, where the codebook may be based on offset values between a slot containing the feedback occasion and a slot containing a downlink transmission 240.

In some examples, the UE 215 and the base station 205 may each construct a feedback codebook for a feedback occasion (e.g., a PUCCH transmission) based on a set of configurable downlink transmissions 240. The set of configurable downlink transmissions may include each of downlink transmissions 240 the base station 205 may potentially schedule for the UE 215. The UE 215 may receive a downlink grant 235 scheduling slots for a downlink transmission 240 of the set of configurable downlink transmissions 240. The downlink transmission 240 may include one or more reference slots corresponding to offset values associated with one or more feedback occasions. The UE 215 may construct a feedback codebook based on a first quantity of slots in each downlink transmission 240 of the set of configurable downlink transmissions 240, a second quantity of reference slots in each downlink transmission 240 of the set of configurable downlink transmissions 240, and a third quantity of configurable offset values associated with one or more feedback occasions. In some examples, the UE 215 may receive control information 230 identifying one or more of the quantities. Based on a size of the feedback codebook, the UE 215 may generate the feedback 245, which may include feedback bits for reporting whether the UE 215 successfully received a downlink transmission 240 in corresponding slots. In some examples, the UE 215 may identify a slot with a symbol reserved for an uplink transmission, and skip generating a corresponding feedback bit for the identified slot.

Figure 3:
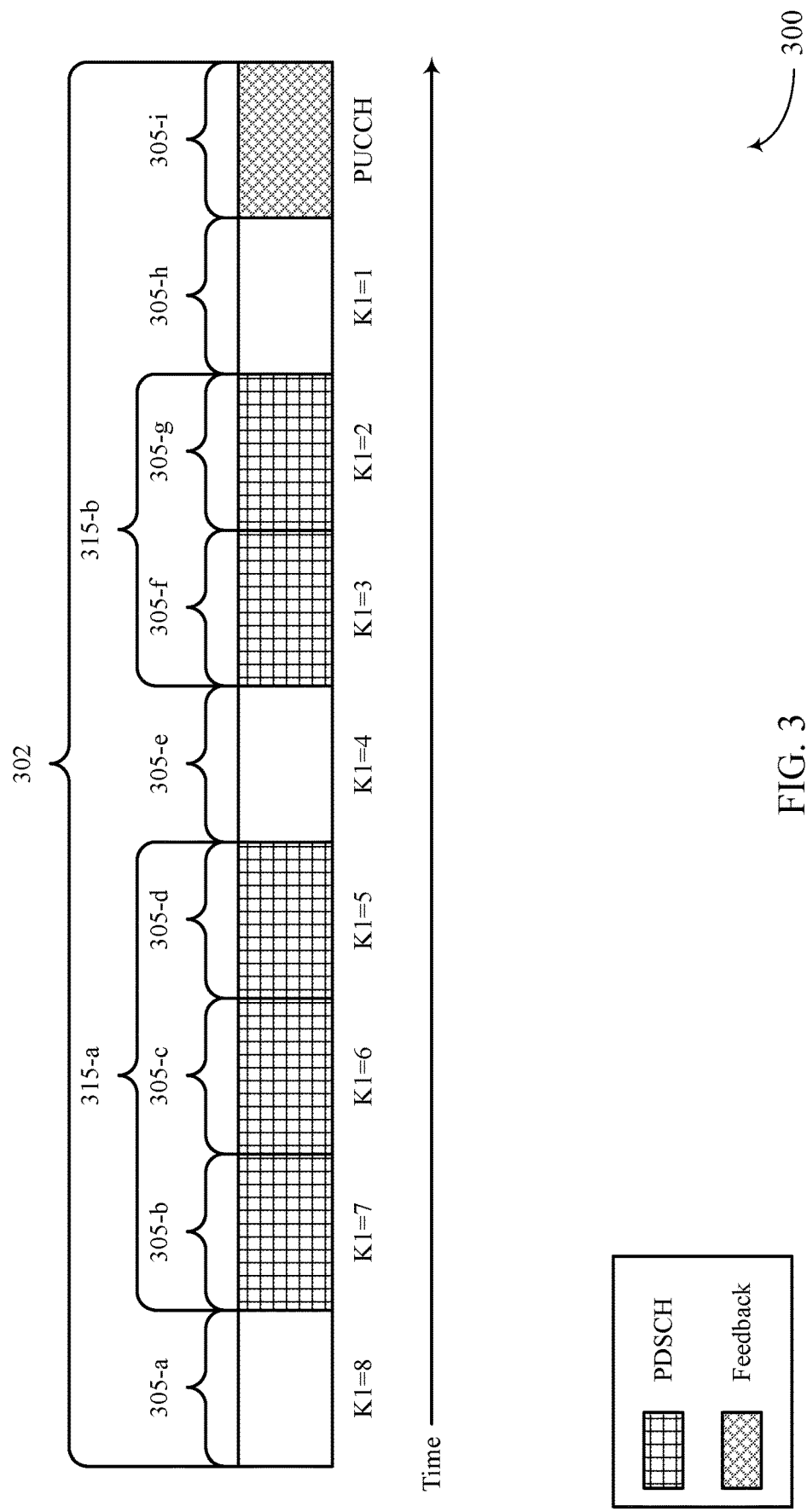
FIGS. 3 through 10 illustrate examples of transmission schemes that support techniques for semi-static codebook design in accordance with one or more aspects of the present disclosure.

FIG. 3 illustrates an example of a transmission scheme 300 that supports techniques for semi-static codebook design in accordance with one or more aspects of the present disclosure. In some examples, the transmission scheme 300 may implement one or more aspects of the wireless communications system 100 or the wireless communications system 200. For example, the transmission scheme 300 may illustrate communications between a base station and a UE, which may be examples of corresponding devices described with reference to FIGS. 1 and 2. The transmission scheme 300 may include features for improved communications reliability, among other benefits.

The transmission scheme 300 may include a set 302 of slots 305 configured for communications between a UE and a base station. For example, a slot 305-*i* may include a feedback occasion (e.g., a PUCCH transmission), in which a UE may report feedback (e.g., HARQ-ACK feedback) indicating whether the UE successfully received downlink transmissions (e.g., PDSCH transmissions) from the base station in the set 302 of slots 305. The UE may generate the feedback according to a codebook, where the codebook may be based on offset values (which may be referred to as K1 values) between the slot 305-*i* containing the feedback occasion and a slot 305 in which a downlink transmission is scheduled. For example, a slot 305-*b*, which is seven slots before the slot 305-*i*, may have an offset value of K1=7. The base station may configure a set of offset values (e.g., via an RRC message), where the configured set of offset values may include slot or mini-slot level offsets between the slot 305 containing the downlink transmission and the slot 305-*i* containing the corresponding feedback occasion. The UE may generate a feedback bit (e.g., an ACK bit or a NACK bit) for each slot 305 or mini-slot (e.g., one or more symbols of a slot 305) of the set 302 which may potentially contain a downlink transmission.

The UE may indicate one or more feedback bits with a corresponding offset value in the configured set of offset values when transmitting the feedback bits in the feedback occasion (e.g., the PUCCH transmission). The UE may generate a feedback bit for each slot 305. If the UE does not detect a downlink grant scheduling a downlink transmission in a slot 305 (e.g., a slot 305-*a*) or mini-slot, the UE may generate a NACK feedback bit corresponding to the slot 305. In some examples, a slot 305 may be configured (e.g., via an RRC message) as reserved for uplink transmissions. For example, one or more symbols (not shown) of the slot 305 may be reserved for uplink transmission. The UE may assume that the base station will not schedule a downlink transmission in the slot 305 reserved for uplink transmissions, and so the UE may refrain from generating a corresponding feedback bit.

In a first example, the base station may configure a set of offset values K1=1/2/3/4/5/6/7/8, and configure single-PDSCH grants of sets of configurable downlink transmissions. For example, the base station may transmit downlink grants (e.g., single PDSCH grants) for downlink transmissions in slots 305-*b*, 305-*c*, 305-*d*, 305-*f*, and 305-*g*. The UE may fail to detect the downlink grants for the downlink transmissions in the slots 305-*c* and 305-*g*. The UE may reserve a feedback bit for each potential offset value, and so report eight feedback bits to the base station. That is, a size of a feedback codebook (e.g., a semi-static codebook) may be eight, based on the configured set of offset values. The UE may transmit NACK bits corresponding to the slots 305-*a*, 305-*c*, 305-*e*, 305-*g*, and 305-*h*, because the UE did not receive associated downlink grants. The UE may transmit feedback bits corresponding to the slots 305-*b*, 305-*d*, and 305-*f* based on whether the UE successfully received the downlink transmissions scheduled by the received downlink grants.

In a second example, the base station may transmit downlink grants (e.g., multi-PDSCH grants) scheduling downlink transmissions in groups 315 of slots 305. A set of configurable downlink transmissions in the second example may include two multi-PDSCH grants, where a first multi-PDSCH grant may schedule three PDSCH transmissions with an offset value of K1=5 and a second multi-PDSCH grant may schedule two PDSCH transmissions with an offset value of K1=2. That is, the first downlink grant may schedule downlink transmissions in a group 315-*a*, which may include the slots 305-*b*, 305-*c*, and 305-*d*, and the second downlink grant may schedule downlink transmissions in a group 315-*b*, which may include the slots 305-*f* and 305-*g*. The UE may use the feedback codebook of the first example without changes, as the possible downlink transmission locations are the same as those of the first example. The base station may indicate the set of offset values in a downlink control information (DCI) message (e.g., three bits in the DCI message may indicate the eight configured offset values), which may limit which downlink transmissions a multi-PDSCH grant may schedule. In some examples, it may be possible to increase a size of a table of offset values in the DCI message to cover more possible offsets, which may increase control overhead in the communications between the base station and the UE.

In some examples, the UE and the base station may each construct a feedback codebook for a feedback occasion (e.g., a PUCCH transmission) based on a set of configurable downlink transmissions. The set of configurable downlink transmissions may include downlink transmissions the base station may potentially schedule for the UE. The UE may receive a downlink grant scheduling slots 305 for a downlink transmission of the set of configurable downlink transmissions. In some examples, the downlink transmission may include one or more reference slots corresponding to offset values associated with the feedback occasion in the slot 305-*i*. A reference slot of a downlink transmission may be a last slot 305 of a group 315 of slots 305 in the downlink transmission. For example, the slot 305-*d* may be a reference slot for the group 315-*a*.

The UE may construct a feedback codebook based on a first quantity of slots 305 in the set of configurable downlink transmissions, a second quantity of reference slots in the set of configurable downlink transmissions, and a third quantity of configurable offset values associated with one or more feedback occasions. In some examples, the UE may receive control information (e.g., an RRC message or a DCI message) identifying one or more of the quantities. Based on a size of the feedback codebook, the UE may generate the feedback, which may include feedback bits for reporting whether the UE successfully received a downlink transmission in corresponding slots 305. In some examples, the UE may identify a slot 305 with a symbol reserved for an uplink transmission (not shown), and skip generating a corresponding feedback bit for the identified slot 305.

In a first implementation, the UE may construct the feedback codebook (e.g., a semi-static codebook) based on assuming the base station will refrain from scheduling a configurable downlink transmission that overlaps with reserved uplink symbols, and that each configurable downlink transmission configures a last scheduled slot as a reference slot. The UE may initiate a set of slots for which to generate feedback bits. The set of slots may initially be empty. Starting from the slot 305-*i* containing the feedback occasion, the UE may enumerate the configured set of offset values (e.g., a list of offset values configured by a dl-DataToUL-ACK field of an RRC message) to identify possible (e.g., potential) last slots 305 (e.g., reference slots) of groups 315 of configurable downlink transmissions scheduled by a multi-PDSCH grant. Additionally or alternatively, the UE may identify slots 305 of configurable downlink transmissions scheduled by single PDSCH grants. For an identified slot 305, the UE may check if one or more indicator values (e.g., a SLIV) of the associated configurable downlink transmission overlaps partially with symbols (not shown) reserved for uplink transmission. If all of the indicator values do not overlap with reserved symbols, the UE may update the set of slots by adding the one or more slots 305 of the configurable downlink transmission to the set of slots. Alternatively, if any of the indicator values overlap with reserved symbols, the UE may refrain from adding the slots 305 of the configurable downlink transmission. The UE may generate feedback bits for each slot in the updated set of slots, and transmit the feedback bits to the base station.

In a second implementation, the UE may construct the feedback codebook based on assuming the base station may schedule a configurable downlink transmission that overlaps with reserved uplink symbols, but cancel the transmission (e.g., the PDSCH transmission) in the slot 305 that overlaps with the reserved uplink symbols, and that each configurable downlink transmission configures a last scheduled slot as a reference slot. The UE may initiate a set of slots for which to generate feedback bits. The set of slots may initially be empty. Starting from the slot 305-*i* containing the feedback occasion, the UE may enumerate the configured set of offset values (e.g., a list of offset values configured by a dl-DataToUL-ACK field of an RRC message) to identify possible (e.g., potential) last slots 305 (e.g., reference slots) of groups 315 of configurable downlink transmissions scheduled by a multi-PDSCH grant. Additionally or alternatively, the UE may identify slots 305 of configurable downlink transmissions scheduled by single PDSCH grants. For an identified slot 305, the UE may check if one or more indicator values (e.g., a SLIV) of the associated configurable downlink transmission overlaps partially with symbols (not shown) reserved for uplink transmission. If an indicator value does not overlap with reserved symbols, the UE may update the set of slots by adding the one or more slots 305 associated with the indicator value to the set of slots. Additionally or alternatively, if an indicator value overlaps with reserved symbols, the UE may refrain from adding the one or more slots 305 associated with the indicator value to the set of slots. The UE may generate feedback bits for each slot in the updated set of slots, and transmit the feedback bits to the base station.

In a third implementation, the UE may construct the feedback codebook based on assuming that each configurable downlink transmission may include one or more reference slots, where each reference slot may be a last slot 305 of a group 315 of slots 305 of the configurable downlink transmission. In some examples, one or more operations of the third implementation may be combined with one or more operations of the first implementation or one or more operations of the second implementation. The UE may initiate a set of slots for which to generate feedback bits. The set of slots may initially be empty. Starting from the slot 305-*i* containing the feedback occasion, the UE may enumerate the configured set of offset values (e.g., a list of offset values configured by a dl-DataToUL-ACK field of an RRC message) to identify possible (e.g., potential) last slots 305 (e.g., reference slots) of groups 315 of configurable downlink transmissions scheduled by a multi-PDSCH grant. Additionally or alternatively, the UE may identify slots 305 of configurable downlink transmissions scheduled by single PDSCH grants. For an identified slot 305, the UE may check if one or more indicator values (e.g., a SLIV) of the associated configurable downlink transmission overlaps partially with symbols (not shown) reserved for uplink transmission. If the indicator values associated with a group 315 do not overlap with reserved symbols, the UE may update the set of slots by adding the one or more slots 305 of the group 315 to the set of slots. Additionally or alternatively, if an indicator value of a group 315 overlaps with reserved symbols, the UE may refrain from adding slots 305 of the group 315 to the set of slots (e.g., according to the first implementation) or refrain from adding slots 305 in the group 315 whose indicator value overlaps with uplink symbols to the set of slots (e.g., according to the second implementation). The UE may generate feedback bits for each slot in the updated set of slots, and transmit the feedback bits to the base station.

Figure 4:
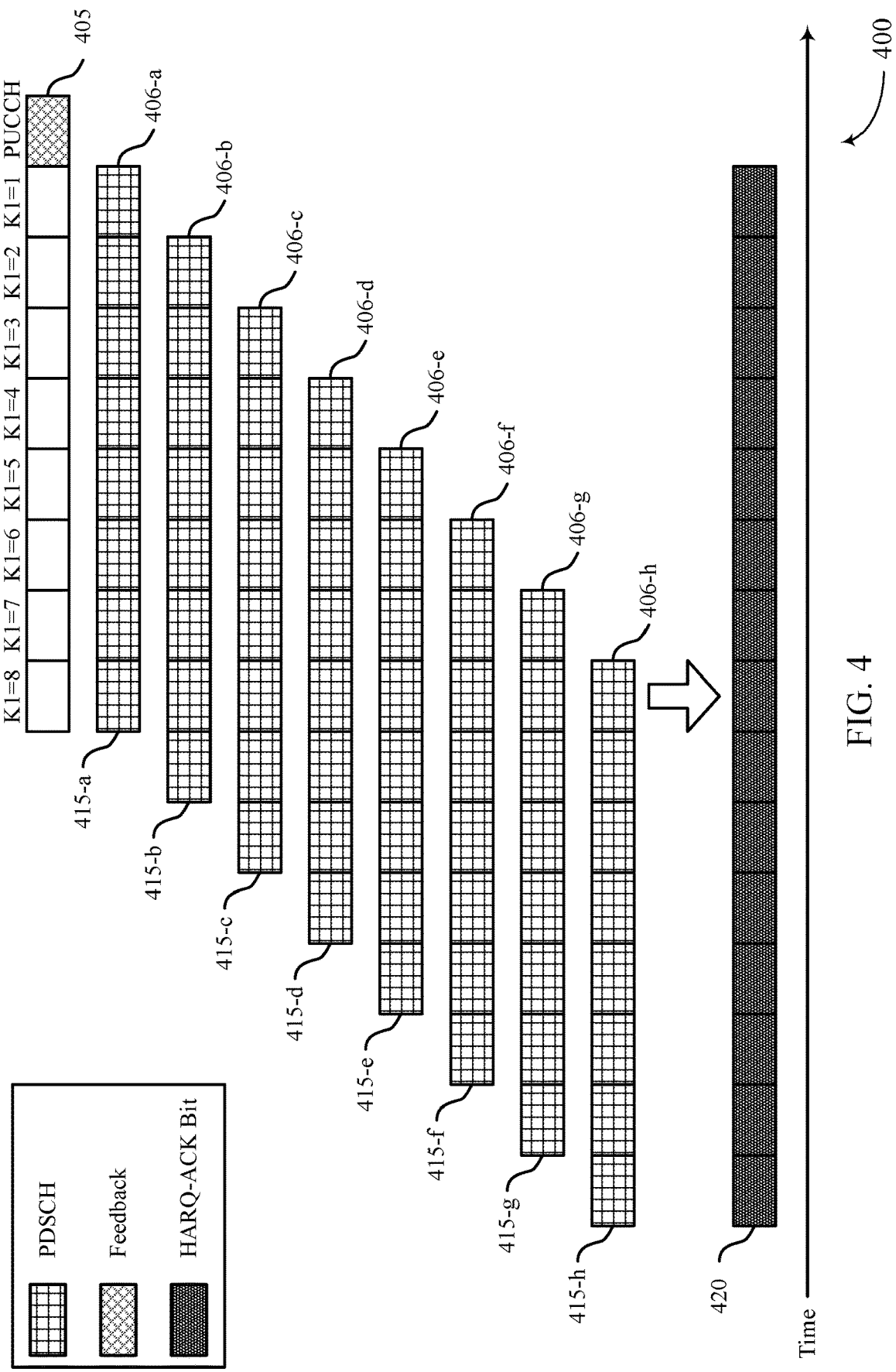

FIG. 4 illustrates an example of a transmission scheme 400 that supports techniques for semi-static codebook design in accordance with one or more aspects of the present disclosure. In some examples, the transmission scheme 400 may implement one or more aspects of the wireless communications system 100 or the wireless communications system 200. For example, the transmission scheme 400 may illustrate communications between a base station and a UE, which may be examples of corresponding devices described with reference to FIGS. 1 and 2. The transmission scheme 400 may include features for improved communications reliability, among other benefits.

In the transmission scheme 400 illustrated in FIG. 4, the base station may configure the UE with a set of offset values K1=1/2/3/4/5/6/7/8 corresponding to a feedback occasion (e.g., a PUCCH transmission) in a slot 405. Further, the base station may configure downlink grants that may schedule downlink transmissions in a single slot (e.g., a single PDSCH grant) or in a group 415 of eight continuous slots. The base station may also indicate that no semi-static uplink transmissions are configured (e.g., no symbols are reserved for uplink transmissions). The UE may construct a feedback codebook 420 of feedback bits (e.g., HARQ-ACK bits) based on the configured set of offset values and a set of configurable (e.g., potential) downlink transmissions. The configurable downlink transmissions may include groups 415-a through 415-h, where each group 415 may include a reference slot 406. For example, the group 415-a may include a reference slot 406-a (e.g., a last slot) corresponding to an offset value K1=1, and the group 415-h may include a reference slot 406-h corresponding to an offset value K1=8.

Based on the configured set of offset values, the set of configurable downlink transmissions, and the reference slots 406 of the groups 415 of the configurable downlink transmissions, the UE may construct the feedback codebook 420 with a size of fifteen, and generate feedback bits for each potential slot included in the set of configurable downlink transmissions. The UE may transmit the fifteen feedback bits to the base station in the feedback occasion in the slot 405.

Figure 5:
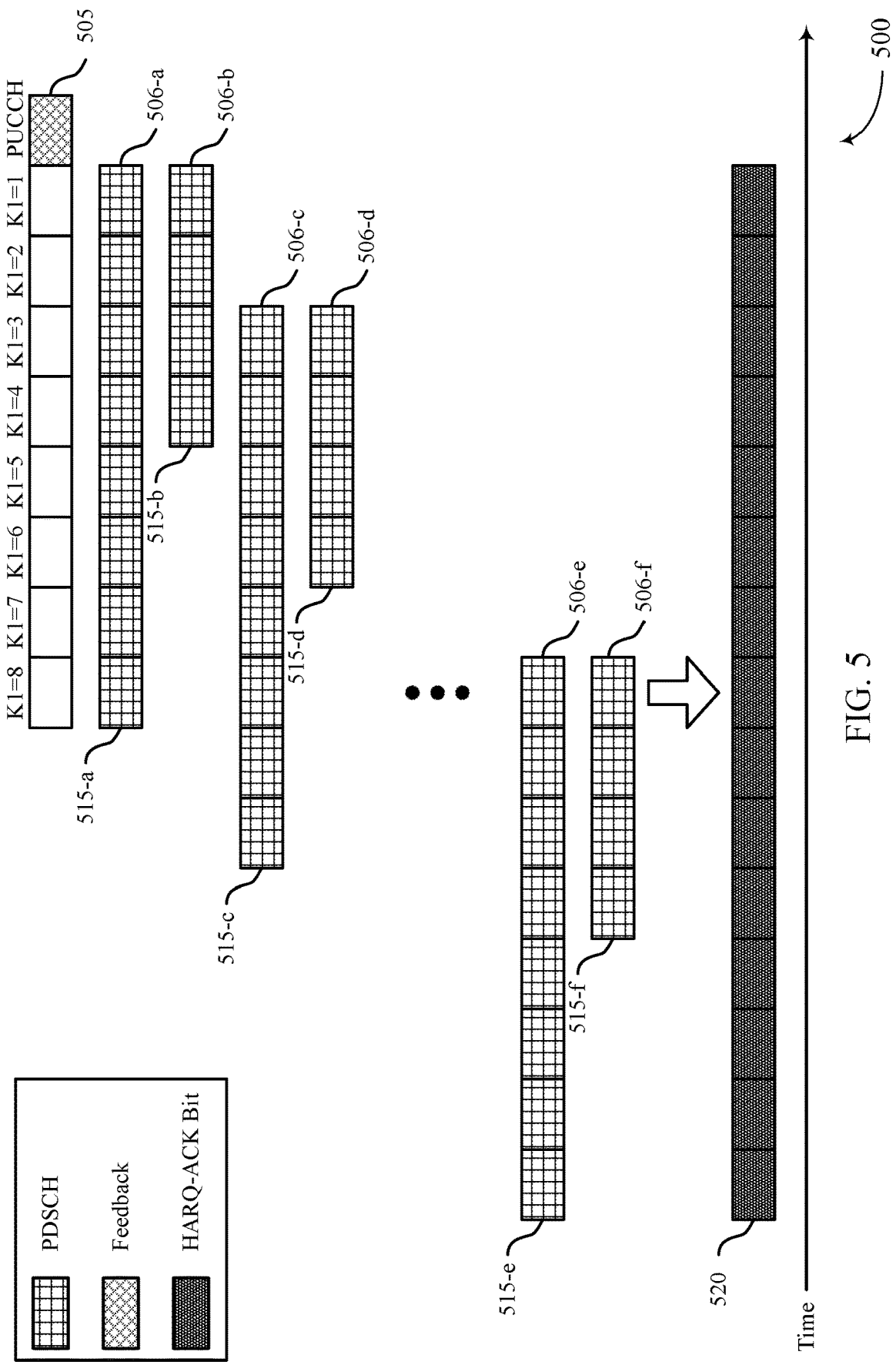

FIG. 5 illustrates an example of a transmission scheme 500 that supports techniques for semi-static codebook design in accordance with one or more aspects of the present disclosure. In some examples, the transmission scheme 500 may implement one or more aspects of the wireless communications system 100 or the wireless communications system 200. For example, the transmission scheme 500 may illustrate communications between a base station and a UE, which may be examples of corresponding devices described with reference to FIGS. 1 and 2. The transmission scheme 500 may include features for improved communications reliability, among other benefits.

In the transmission scheme 500 illustrated in FIG. 5, the base station may configure the UE with a set of offset values K1=1/2/3/4/5/6/7/8 corresponding to a feedback occasion (e.g., a PUCCH transmission) in a slot 505. Further, the base station may configure downlink grants that may schedule downlink transmissions in a single slot (e.g., a single PDSCH grant) or in a group 515 of continuous slots, where a length of a group 515 may be four continuous slots or eight continuous slots. The base station may also indicate that no semi-static uplink transmissions are configured (e.g., no symbols are reserved for uplink transmissions). The UE may construct a feedback codebook 520 of feedback bits (e.g., HARQ-ACK bits) based on the configured set of offset values and a set of configurable (e.g., potential) downlink transmissions. The configurable downlink transmissions may include groups 515-a through 515-f, where each group 515 may include a reference slot 506. For example, the group 515-a may have a length of eight slots and include a reference slot 506-a (e.g., a last slot) corresponding to an offset value K1=1, and the group 515-b may have a length of four slots and include a reference slot 506-b corresponding to an offset value K1=1. Similarly, the group 515-e may have a length of eight slots and include a reference slot 506-e (e.g., a last slot) corresponding to an offset value K1=8, and the group 515-f may have a length of four slots and include a reference slot 506-f corresponding to an offset value K1=8.

Based on the configured set of offset values, the set of configurable downlink transmissions, and the reference slots 506 of the groups 515 of the configurable downlink transmissions, the UE may construct the feedback codebook 520 with a size of fifteen, and generate feedback bits for each potential slot included in the set of configurable downlink transmissions. The UE may transmit the fifteen feedback bits to the base station in the feedback occasion in the slot 505.

Figure 6:
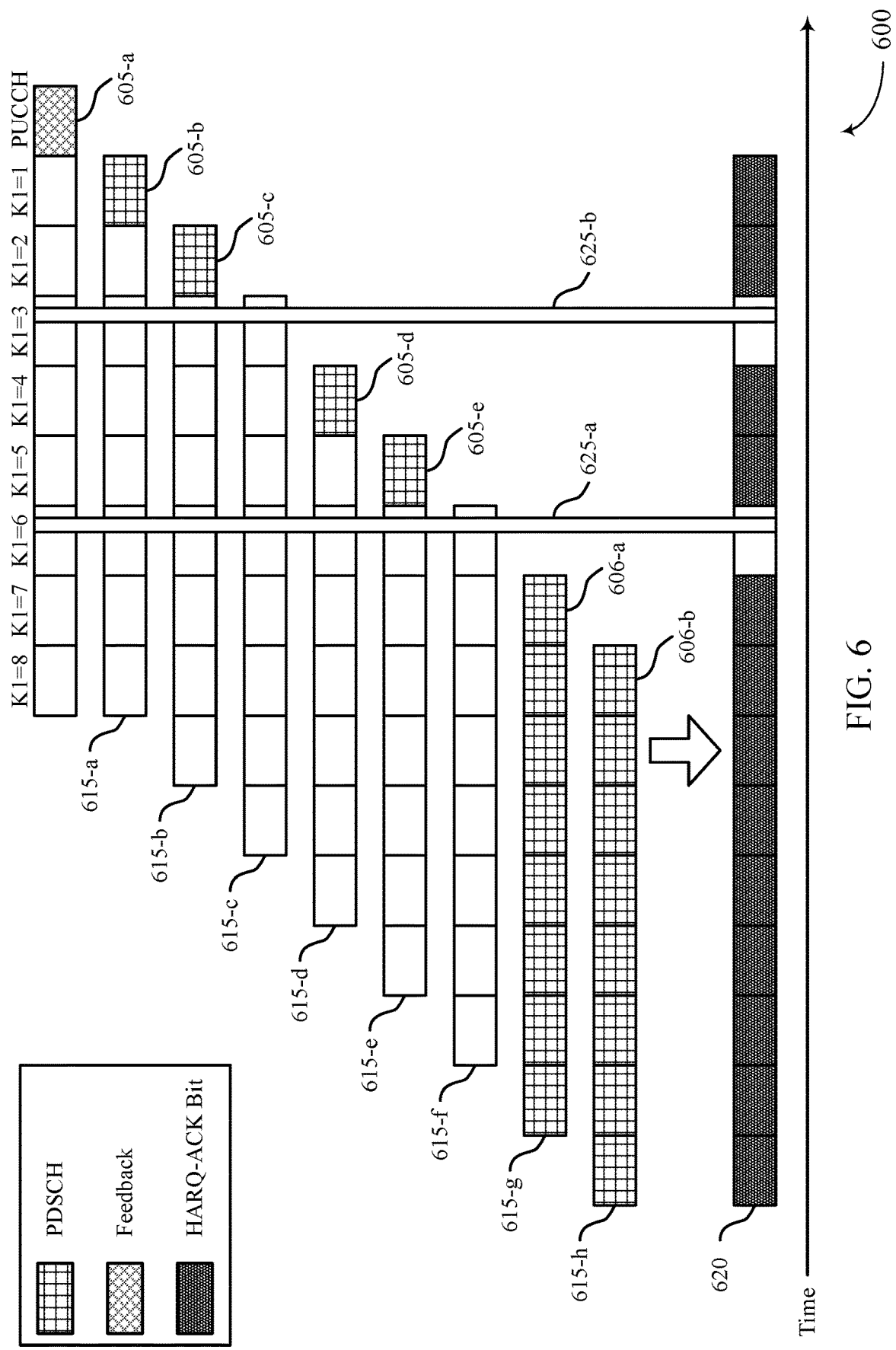

FIG. 6 illustrates an example of a transmission scheme 600 that supports techniques for semi-static codebook design in accordance with one or more aspects of the present disclosure. In some examples, the transmission scheme 600 may implement one or more aspects of the wireless communications system 100 or the wireless communications system 200. For example, the transmission scheme 600 may illustrate communications between a base station and a UE, which may be examples of corresponding devices described with reference to FIGS. 1 and 2. The transmission scheme 600 may include features for improved communications reliability, among other benefits.

In the transmission scheme 600 illustrated in FIG. 6, the base station may configure the UE with a set of offset values K1=1/2/3/4/5/6/7/8 corresponding to a feedback occasion (e.g., a PUCCH transmission) in a slot 605-a. Further, the base station may configure downlink grants that may schedule downlink transmissions in a single slot 605 (e.g., a single PDSCH grant) or in a group 615 of eight continuous slots. The base station may also indicate that semi-static uplink transmissions 625 are configured, where symbols are reserved for an uplink transmission 625-a in a slot corresponding to an offset value K1=6 and symbols are reserved for an uplink transmission 625-b in a slot corresponding to an offset value K1=3.

The UE may construct a feedback codebook 620 of feedback bits (e.g., HARQ-ACK bits) based on the configured set of offset values, a set of configurable (e.g., potential) downlink transmissions, the indicated uplink transmissions 625, and a set of configurable indicator values (e.g., SLIV). For example, the set of configurable indicator values may include a single entry, which may indicate a start symbol index of 0 and a length of 14 symbols for a downlink transmission in a slot. The configurable downlink transmissions may include groups 615-a through 615-h, where each group 615 may include a reference slot 606. The configurable downlink transmissions may also include single slot downlink transmissions in slots 605-b through 605-e. For example, the group 615-g may include a reference slot 606-a (e.g., a last slot) corresponding to an offset value K1=7, and the group 615-h may include a reference slot 606-b corresponding to an offset value K1=8. The slot 605-b may correspond to an offset value K1=1.

In the transmission scheme 600, the UE may operate according to the first implementation described with reference to FIG. 3. That is, the UE may construct the feedback codebook 620 based on assuming the base station will refrain from scheduling a configurable downlink transmission that overlaps with symbols reserved for the uplink transmissions 625. Accordingly, the UE may determine the base station will refrain from transmitting configurable downlink transmissions that include the groups 615-*a* through 615-*f*, and refrain from adding slots to the set of slots corresponding to the feedback codebook 620 based on the groups 615-*a* through 615-*f*. However, the UE may add slots to the set of slots corresponding to the feedback codebook 620 based on identifying configurable downlink transmissions that may include the groups 615-*g* and 615-*h*, and the slots 605-*b* through 605-*e*.

Based on the configured set of offset values, the set of configurable downlink transmissions, the reference slots 606 of the groups 615 of the configurable downlink transmissions, the set of configurable indicator values, and the uplink transmissions 625, the UE may construct the feedback codebook 620 with a size of thirteen, and generate feedback bits for each potential slot included in the set of configurable downlink transmissions. The UE may transmit the thirteen feedback bits to the base station in the feedback occasion in the slot 605.

Figure 7:
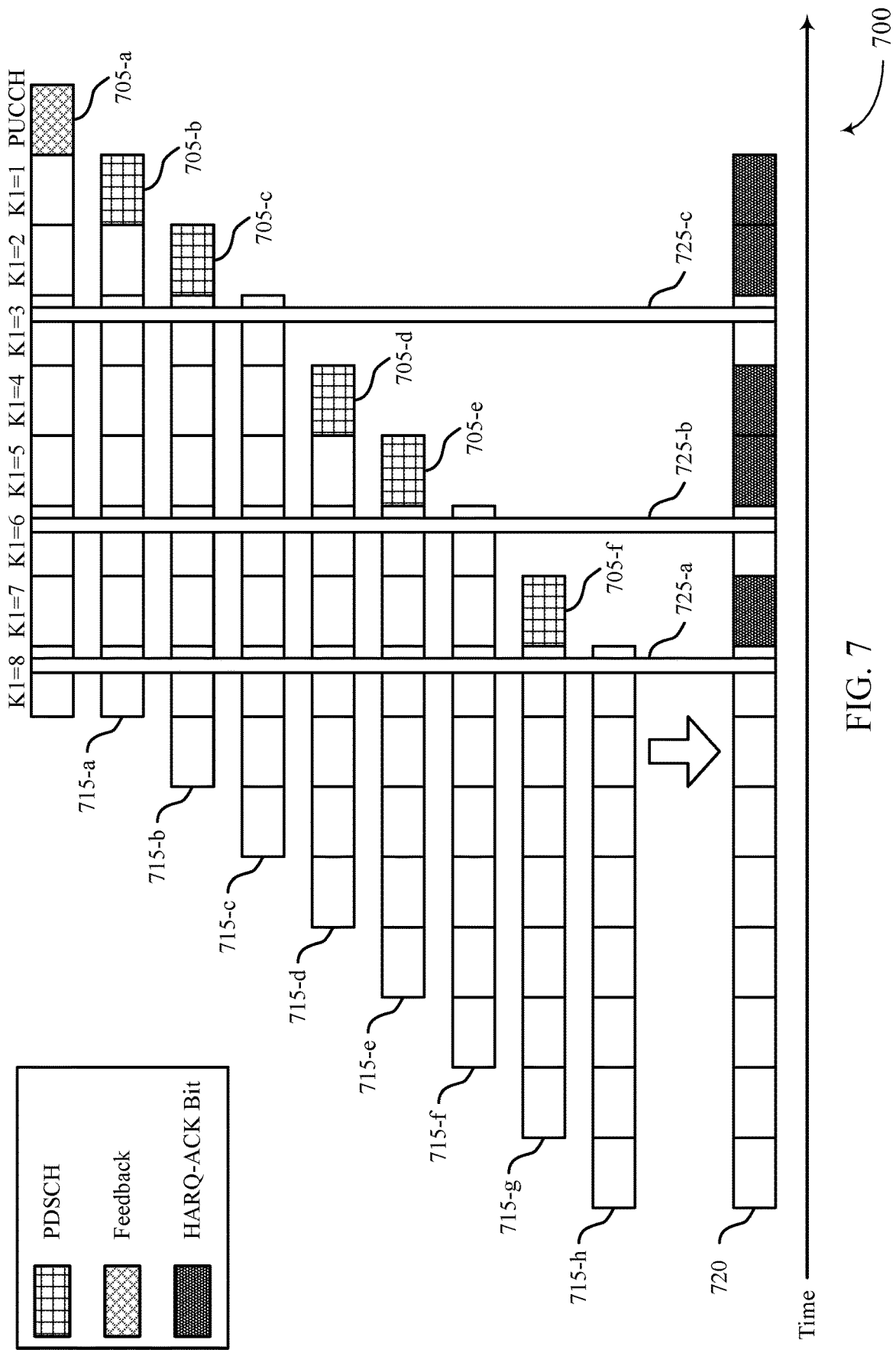

FIG. 7 illustrates an example of a transmission scheme 700 that supports techniques for semi-static codebook design in accordance with one or more aspects of the present disclosure. In some examples, the transmission scheme 700 may implement one or more aspects of the wireless communications system 100 or the wireless communications system 200. For example, the transmission scheme 700 may illustrate communications between a base station and a UE, which may be examples of corresponding devices described with reference to FIGS. 1 and 2. The transmission scheme 700 may include features for improved communications reliability, among other benefits.

In the transmission scheme 700 illustrated in FIG. 7, the base station may configure the UE with a set of offset values K1=1/2/3/4/5/6/7/8 corresponding to a feedback occasion (e.g., a PUCCH transmission) in a slot 705-*a*. Further, the base station may configure downlink grants that may schedule downlink transmissions in a single slot 705 (e.g., a single PDSCH grant) or in a group 715 of eight continuous slots. The base station may also indicate that semi-static uplink transmissions 725 are configured, where symbols are reserved for an uplink transmission 725-*a* in a slot corresponding to an offset value K1=8, symbols are reserved for an uplink transmission 725-*b* in a slot corresponding to an offset value K1=6, and symbols are reserved for an uplink transmission 725-*c* in a slot corresponding to an offset value K1=3.

The UE may construct a feedback codebook 720 of feedback bits (e.g., HARQ-ACK bits) based on the configured set of offset values, a set of configurable (e.g., potential) downlink transmissions, the indicated uplink transmissions 725, and a set of configurable indicator values (e.g., SLIV). For example, the set of configurable indicator values may include a single entry, which may indicate a start symbol index of 0 and a length of 14 symbols for a downlink transmission in a slot. The configurable downlink transmissions may include groups 715-*a* through 715-*h*, as well as single slot downlink transmissions in slots 705-*b* through 705-*f*. For example, the group 715-*a* may include a reference slot (e.g., a last slot) corresponding to an offset value K1=1, and the group 715-*h* may include a reference slot corresponding to an offset value K1=8. The slot 705-*b* may correspond to an offset value K1=1.

In the transmission scheme 700, the UE may operate according to the first implementation described with reference to FIG. 3. That is, the UE may construct the feedback codebook 720 based on assuming the base station will refrain from scheduling a configurable downlink transmission that overlaps with symbols reserved for the uplink transmissions 725. Accordingly, the UE may determine the base station will refrain from transmitting configurable downlink transmissions that include the groups 715-*a* through 715-*h*, and refrain from adding slots to the set of slots corresponding to the feedback codebook 720 based on the groups 715-*a* through 715-*h*. However, the UE may add slots to the set of slots corresponding to the feedback codebook 720 based on identifying configurable downlink transmissions that may include the slots 705-*b* through 705-*f*.

Based on the configured set of offset values, the set of configurable downlink transmissions, the reference slots of the groups 715 of the configurable downlink transmissions, the set of configurable indicator values, and the uplink transmissions 725, the UE may construct the feedback codebook 720 with a size of five, and generate feedback bits for each potential slot included in the set of configurable downlink transmissions. The UE may transmit the five feedback bits to the base station in the feedback occasion in the slot 705.

Figure 8:
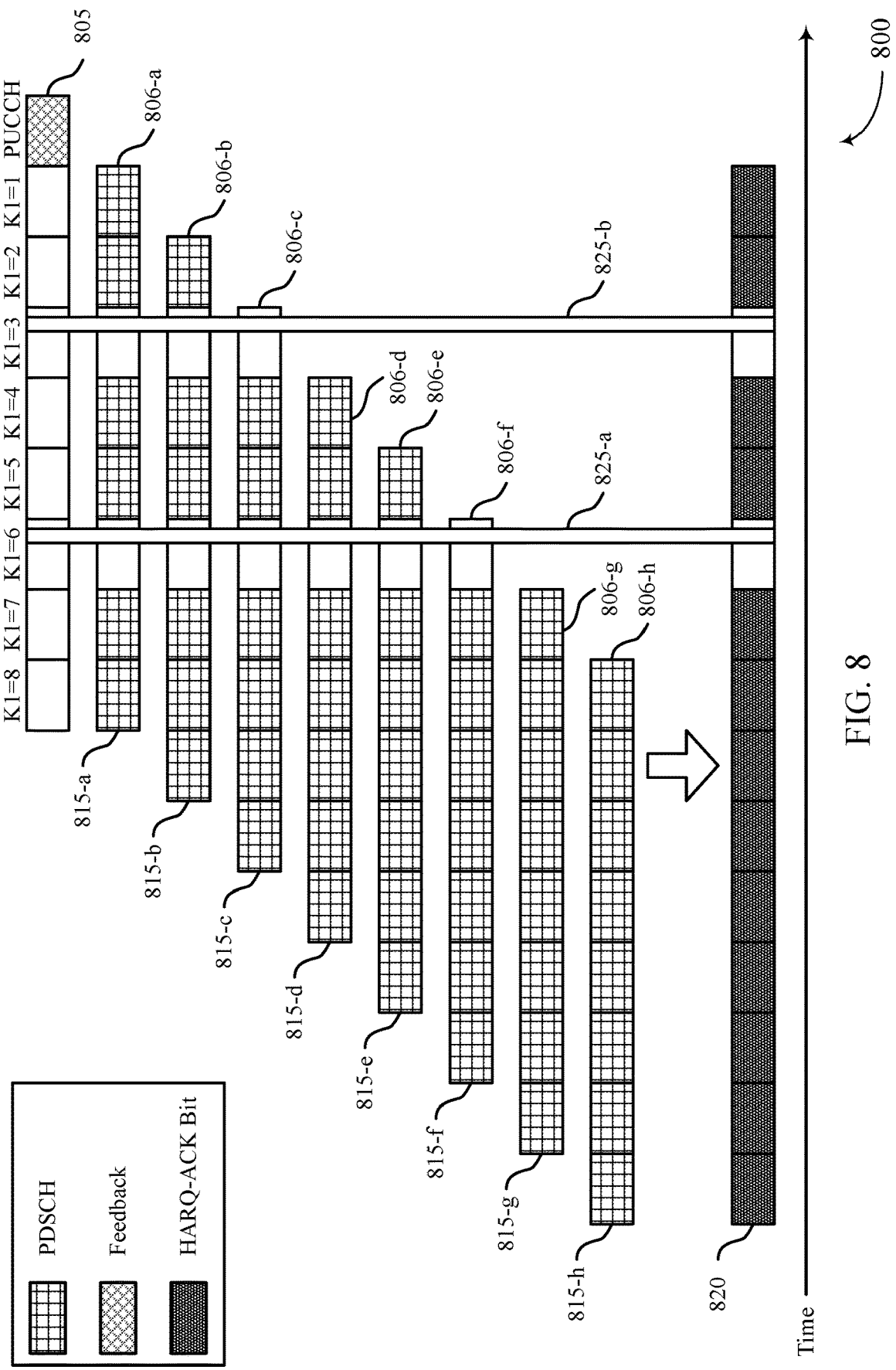

FIG. 8 illustrates an example of a transmission scheme 800 that supports techniques for semi-static codebook design in accordance with one or more aspects of the present disclosure. In some examples, the transmission scheme 800 may implement one or more aspects of the wireless communications system 100 or the wireless communications system 200. For example, the transmission scheme 800 may illustrate communications between a base station and a UE, which may be examples of corresponding devices described with reference to FIGS. 1 and 2. The transmission scheme 800 may include features for improved communications reliability, among other benefits.

In the transmission scheme 800 illustrated in FIG. 8, the base station may configure the UE with a set of offset values K1=1/2/3/4/5/6/7/8 corresponding to a feedback occasion (e.g., a PUCCH transmission) in a slot 805. Further, the base station may configure downlink grants that may schedule downlink transmissions in a single slot (e.g., a single PDSCH grant) or in a group 815 of eight continuous slots. The base station may also indicate that semi-static uplink transmissions 825 are configured, where symbols are reserved for an uplink transmission 825-*a* in a slot corresponding to an offset value K1=6 and symbols are reserved for an uplink transmission 825-*b* in a slot corresponding to an offset value K1=3.

The UE may construct a feedback codebook 820 of feedback bits (e.g., HARQ-ACK bits) based on the configured set of offset values, a set of configurable (e.g., potential) downlink transmissions, the indicated uplink transmissions 825, and a set of configurable indicator values (e.g., SLIV). For example, the set of configurable indicator values may include a single entry, which may indicate a start symbol index of 0 and a length of 14 symbols for a downlink transmission in a slot. The configurable downlink transmissions may include groups 815-*a* through 815-*h*, where each group 815 may include a reference slot 806. For example, the group 815-*a* may include a reference slot 806-*a* (e.g., a last slot) corresponding to an offset value K1=1, and the group 815-*h* may include a reference slot 806-*h* corresponding to an offset value K1=8.

In the transmission scheme 800, the UE may operate according to the second implementation described with reference to FIG. 3. That is, the UE may construct the feedback codebook 820 based on assuming the base station may schedule a configurable downlink transmission that overlaps with reserved uplink symbols, but refrain from transmitting the downlink transmission (e.g., the PDSCH transmission) in a slot that contains symbols reserved for the uplink transmissions 825. Accordingly, the UE may determine the base station will refrain from transmitting configurable downlink transmissions in slots of the groups 815-a through 815-f with indicator values that overlap with the uplink transmissions 825 (e.g., the slot corresponding to the offset value K1=6 and the slot corresponding to the offset value K1=3), and refrain from adding the slots with indicator values that overlap to the set of slots corresponding to the feedback codebook 820 based on the groups 815-a through 815-f. However, the UE may add slots of the groups 815-a through 815-f with indicator values that do not overlap to the set of slots corresponding to the feedback codebook 820, as well as slots of configurable downlink transmissions that may include the groups 815-g and 815-h.

Based on the configured set of offset values, the set of configurable downlink transmissions, the reference slots 806 of the groups 815 of the configurable downlink transmissions, the set of configurable indicator values, and the uplink transmissions 825, the UE may construct the feedback codebook 820 with a size of thirteen, and generate feedback bits for each potential slot included in the set of configurable downlink transmissions. The UE may transmit the thirteen feedback bits to the base station in the feedback occasion in the slot 805.

Figure 9:
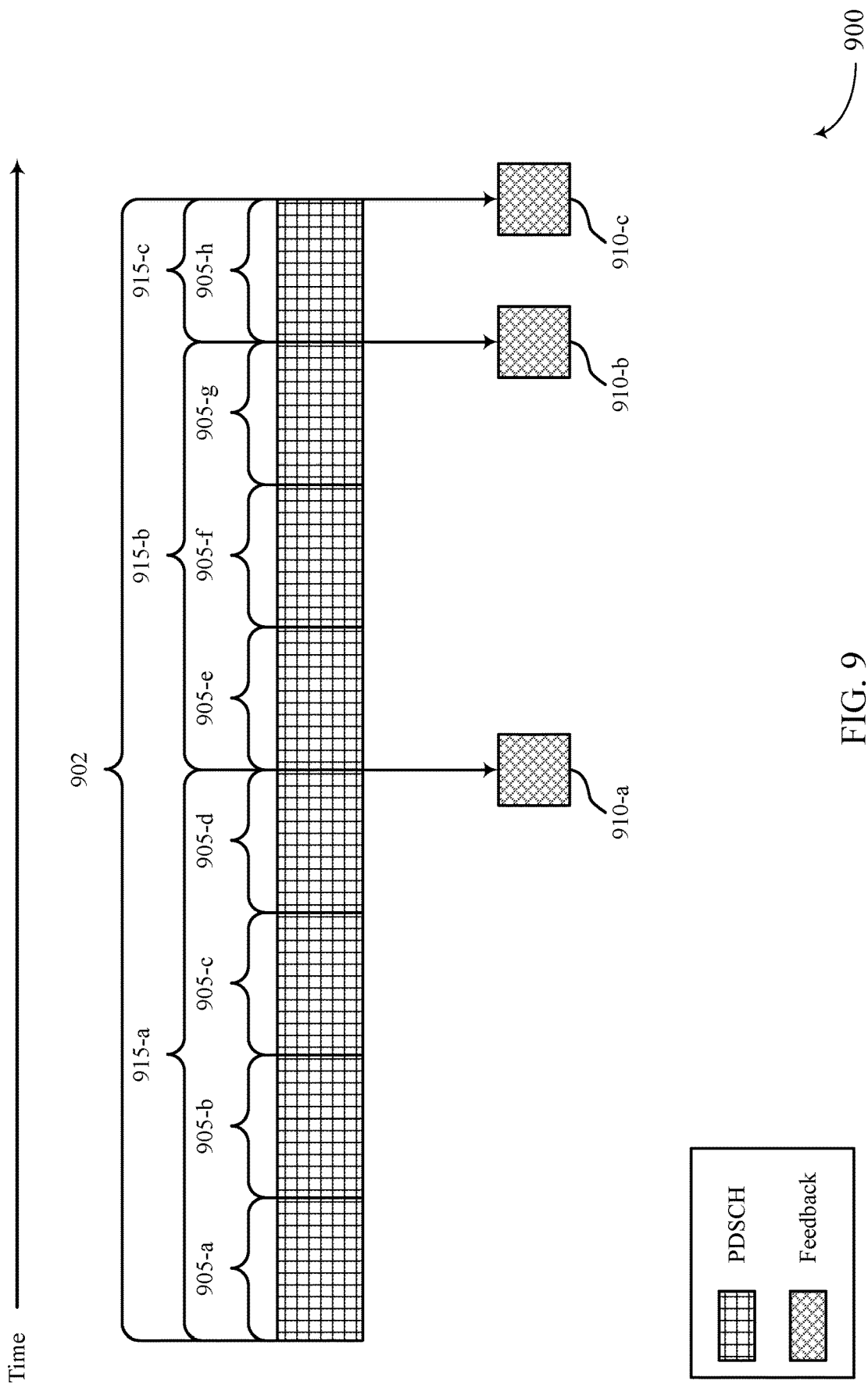

FIG. 9 illustrates an example of a transmission scheme 900 that supports techniques for semi-static codebook design in accordance with one or more aspects of the present disclosure. In some examples, the transmission scheme 900 may implement one or more aspects of the wireless communications system 100 or the wireless communications system 200. For example, the transmission scheme 900 may illustrate communications between a base station and a UE, which may be examples of corresponding devices described with reference to FIGS. 1 and 2. The transmission scheme 900 may include features for improved communications reliability, among other benefits.

The transmission scheme 900 may include a set 902 of slots 905 of a downlink transmission scheduled by the base station to be transmitted to the UE. The set 902 may be divided into groups 915, where each group 915 may include a reference slot (e.g., a last slot 905 of the group 915). For example, a group 915-a may include slots 905-a though 905-d, and the slot 905-d may be a reference slot of the group 915-a.

According to the third implementation described with reference to FIG. 3, the UE may construct a feedback codebook for the downlink transmission illustrated in FIG. 9 based on the reference slots of the groups 915. For example, the UE may identify a feedback occasion 910-a (e.g., a PUCCH occasion) for the group 915-a based an offset value corresponding to the reference slot of the group 915-a (e.g., the slot 905-d). In some examples, the slot 905-d may include the feedback occasion 910-a, where the offset value of the slot 905-d may be K1=0 for the feedback occasion 910-a. Based on identifying the reference slot of the group 915-a and identifying the offset value of the reference slot, the UE may transmit feedback bits for the slots 905 of the group 915-a in the feedback occasion 910-a. Similarly, the UE may transmit feedback bits for the slots 905 of a group 915-b in a feedback occasion 910-b, and a feedback bit for a slot 905-h of a group 915-c in a feedback occasion 910-c.

Figure 10:
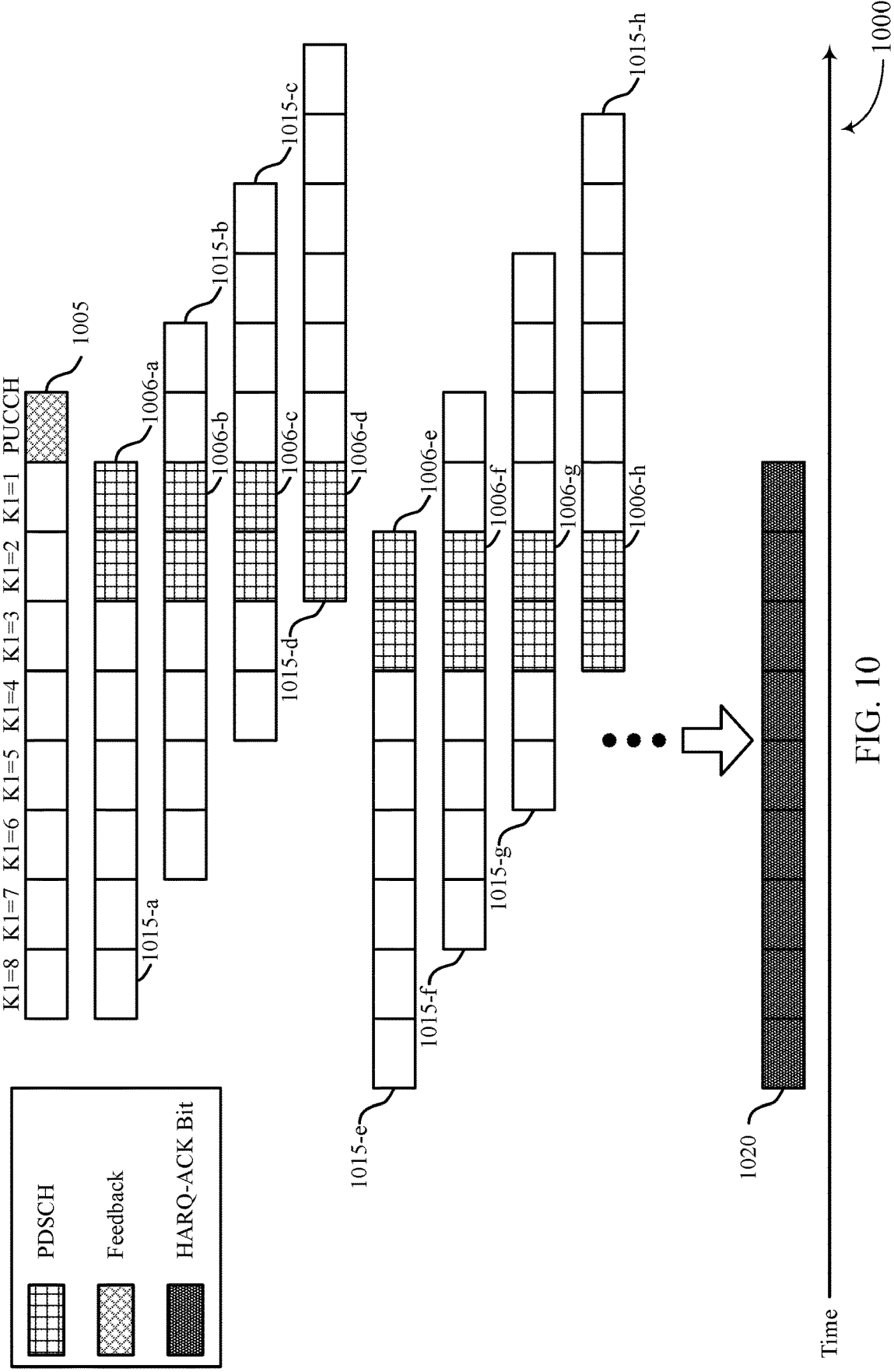

FIG. 10 illustrates an example of a transmission scheme 1000 that supports techniques for semi-static codebook design in accordance with one or more aspects of the present disclosure. In some examples, the transmission scheme 1000 may implement one or more aspects of the wireless communications system 100 or the wireless communications system 200. For example, the transmission scheme 1000 may illustrate communications between a base station and a UE, which may be examples of corresponding devices described with reference to FIGS. 1 and 2. The transmission scheme 1000 may include features for improved communications reliability, among other benefits.

In the transmission scheme 1000 illustrated in FIG. 10, the base station may configure the UE with a set of offset values K1=1/2/3/4/5/6/7/8 corresponding to a feedback occasion (e.g., a PUCCH transmission) in a slot 1005. Further, the base station may configure downlink grants that may schedule downlink transmissions in a single slot (e.g., a single PDSCH grant) or in a set 1015 of eight continuous slots. Each set 1015 may be divided into four groups of two slots each, where a last slot of a group may be a reference slot for the group. The base station may also indicate that no semi-static uplink transmissions are configured (e.g., no symbols are reserved for uplink transmissions). The UE may construct a feedback codebook 1020 of feedback bits (e.g., HARQ-ACK bits) based on the configured set of offset values and a set of configurable (e.g., potential) downlink transmissions. The configurable downlink transmissions may include sets 1015-a through 1015-h where the sets 1015 may include groups with reference slots 1006. For example, a first group of the set 1015-a may include a reference slot 1006-a (e.g., a last slot) corresponding to an offset value K1=1, and a second group of the set 1015-h may include a reference slot 1006-h corresponding to an offset value K1=2.

In the transmission scheme 1000, the UE may operate according to the third implementation described with reference to FIG. 3. That is, the UE may construct the feedback codebook 820 based on identifying the groups of the sets 1015-a through 1015-h, as well as identifying groups of additional sets 1015 (not shown). Based on the configured set of offset values, the set of configurable downlink transmissions, and the reference slots 1006 of the groups in the configurable downlink transmissions, the UE may construct the feedback codebook 1020 with a size of nine, and generate feedback bits for each potential slot included in the set of configurable downlink transmissions. The UE may transmit the nine feedback bits to the base station in the feedback occasion in the slot 1005.

Figure 11:
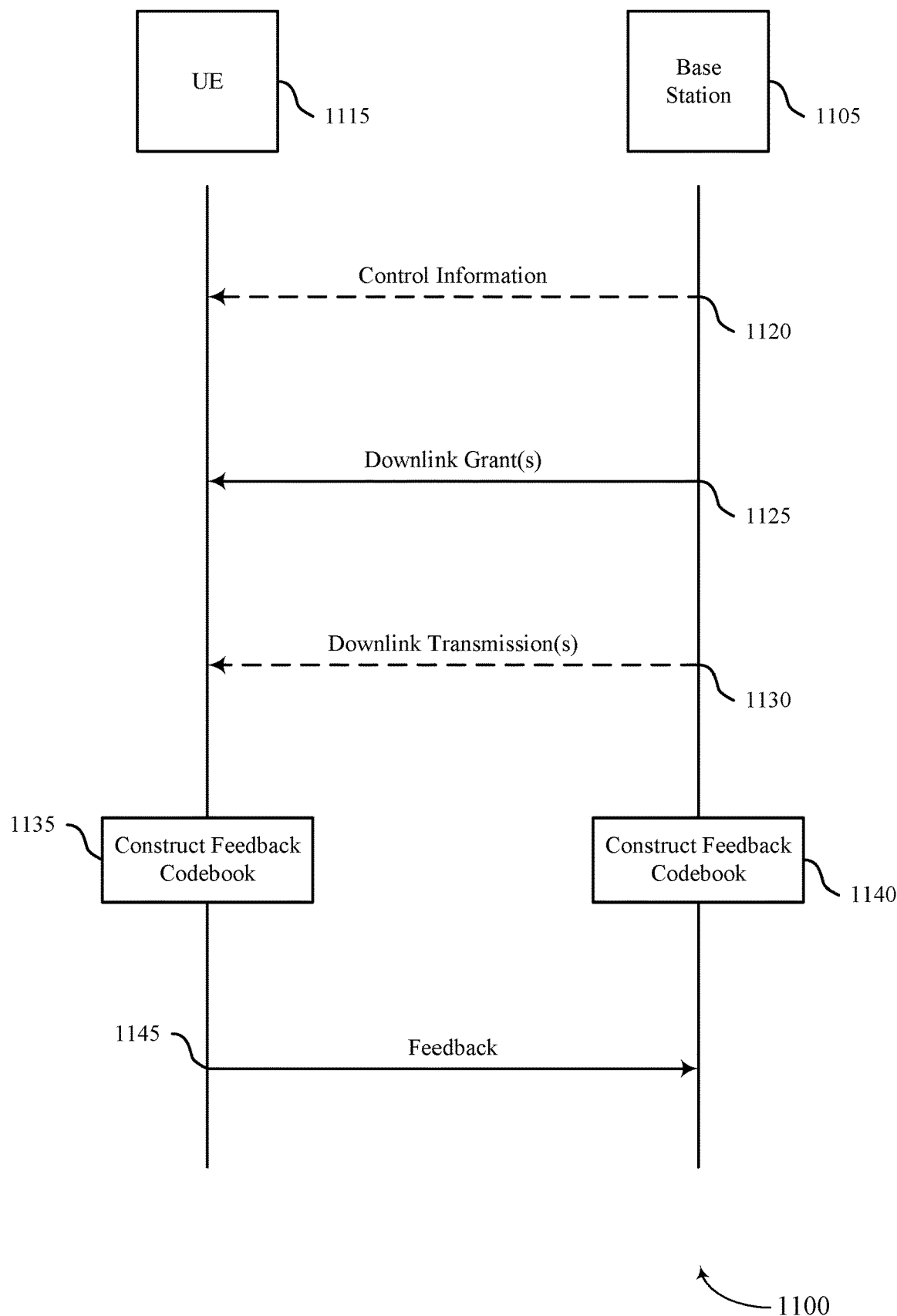
FIG. 11 illustrates an example of a process flow that supports techniques for semi-static codebook design in accordance with one or more aspects of the present disclosure.

FIG. 11 illustrates an example of a process flow 1100 that supports techniques for semi-static codebook design in accordance with one or more aspects of the present disclosure. In some examples, the process flow 1100 may implement one or more aspects of wireless communications systems 100 and 200. For example, the process flow 1100 may include example operations associated with one or more of a base station 1105 or a UE 1115, which may be examples of corresponding devices described with reference to FIGS. 1 and 2. In the following description of the process flow 1100, the operations between the base station 1105 and the UE 1115 may be performed in a different order than the example order shown, or the operations performed by the base station 1105 and the UE 1115 may be performed in different orders or at different times. Some operations may also be omitted from the process flow 1100, and other operations may be added to the process flow 1100. The operations performed by the base station 1105 and the UE 1115 may support improvements to downlink transmission operations and, in some examples, may promote improvements to communications efficiency, among other benefits.

In some examples, at 1120 the UE 1115 may receive control information from the base station 1105. The control information may indicate a first quantity of slots in a set of configurable downlink transmissions (e.g., PDSCH transmissions), a second quantity of reference slots in the set of configurable downlink transmissions, a third quantity of configurable offset values (e.g., K1 values) associated with one or more feedback occasions, a fourth quantity of configurable indicator values (e.g., SLIV) associated with the set of configurable downlink transmissions, or any combination thereof. The UE 1115 may receive the control information in an RRC message or a DCI message. The set of configurable downlink transmissions may include downlink transmissions the base station 1105 may potentially schedule for the UE 1115 using downlink grants. A reference slot of a downlink transmission may be a last slot of a group of slots in the downlink transmissions.

At 1125, the UE 1115 may receive one or more downlink grants scheduling one or more downlink transmissions of the set of configurable downlink transmissions. Based on the received downlink grants, the UE 1115 may monitor for the scheduled downlink transmissions, and in some examples, at 1130 the UE 1115 may receive one or more of the scheduled downlink transmissions.

At 1135, the UE 1115 may construct a feedback codebook, for example based on the quantities indicated in the control information. The UE 1115 may construct the feedback codebook according to the first implementation or the second implementation described with reference to FIG. 3. In some examples, the UE 1115 may construct the feedback codebook according to the third implementation in combination with the first implementation or the second implementation. For example, a size of the feedback codebook may be based on the first quantity of slots in the set of configurable downlink transmissions, the second quantity of reference slots in the set of configurable downlink transmissions, the third quantity of configurable offset values associated with the one or more feedback occasions, the fourth quantity of configurable indicator values associated with the set of configurable downlink transmissions, or any combination thereof. Based on the size of the feedback codebook, the UE 1115 may generate feedback, which may include feedback bits (e.g., HARQ-ACK bits) for reporting whether the UE 1115 successfully received a downlink transmission in corresponding slots. In some examples, the UE 1115 may identify a slot with a symbol reserved for an uplink transmission, and skip generating a corresponding feedback bit for the identified slot according to the first implementation or the second implementation. At 1140, the base station 1105 may construct the feedback codebook and monitor for the feedback from the UE 1115.

At 1145, the UE 1115 may transmit the generated feedback to the base station 1105 according to the constructed feedback codebook. The UE 1115 may transmit the feedback in a feedback occasion of the one or more feedback occasions. Based on constructing the feedback codebook and monitoring for the feedback, the base station 1105 may receive the feedback, which may improve communications reliability for subsequent downlink communications with the UE 1115.

Figure 12:
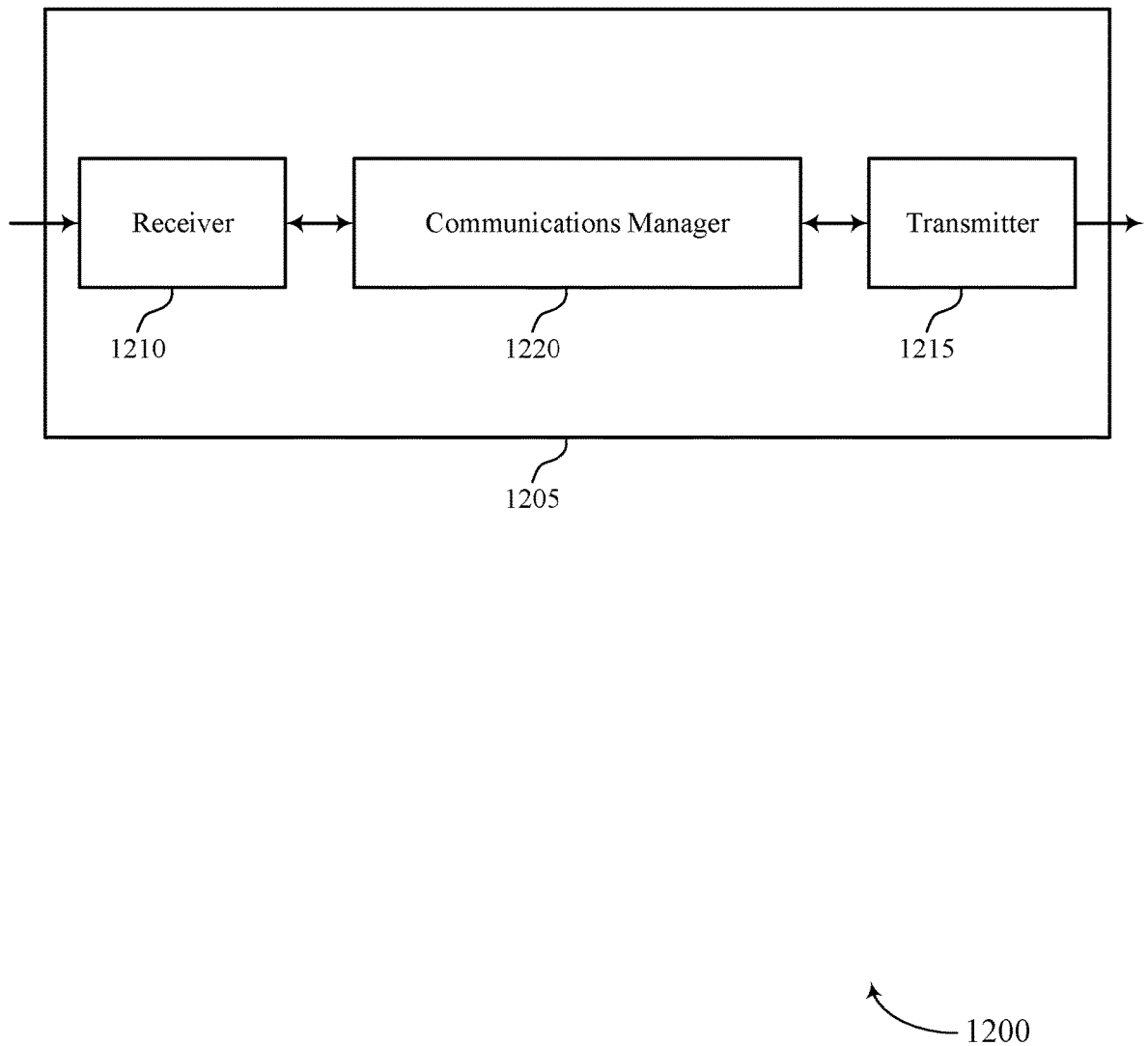
FIGS. 12 and 13 show block diagrams of devices that support techniques for semi-static codebook design in accordance with one or more aspects of the present disclosure.

FIG. 12 shows a block diagram 1200 of a device 1205 that supports techniques for semi-static codebook design in accordance with one or more aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for semi-static codebook design). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for semi-static codebook design). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for semi-static codebook design as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a UE in accordance with examples as disclosed herein. For example, the communications manager 1220 may be configured as or otherwise support a means for receiving, from a base station, one or more grants, a grant of the one or more grants scheduling a downlink transmission, one or more reference slots of the downlink transmission each corresponding to a respective offset value associated with a feedback occasion of one or more feedback occasions. The communications manager 1220 may be configured as or otherwise support a means for transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reducing power consumption and increasing transmission reliability. In some aspects, the processor of the device 1205 may adjust a size of a feedback codebook based on potential configurable downlink transmissions. For example, the processor of the device 1205 may turn on one or more processing units for processing downlink grants, increase a processing clock, or a similar mechanism within the device 1205. As such, when subsequent downlink grants are received, the processor may more accurately monitor for associated downlink transmissions and generate corresponding feedback. Improvements in feedback transmission may result in improvements in power saving and communications reliability, which may further increase power efficiency at the device 1205 (e.g., by eliminating unnecessary repeated downlink transmissions).

Figure 13:
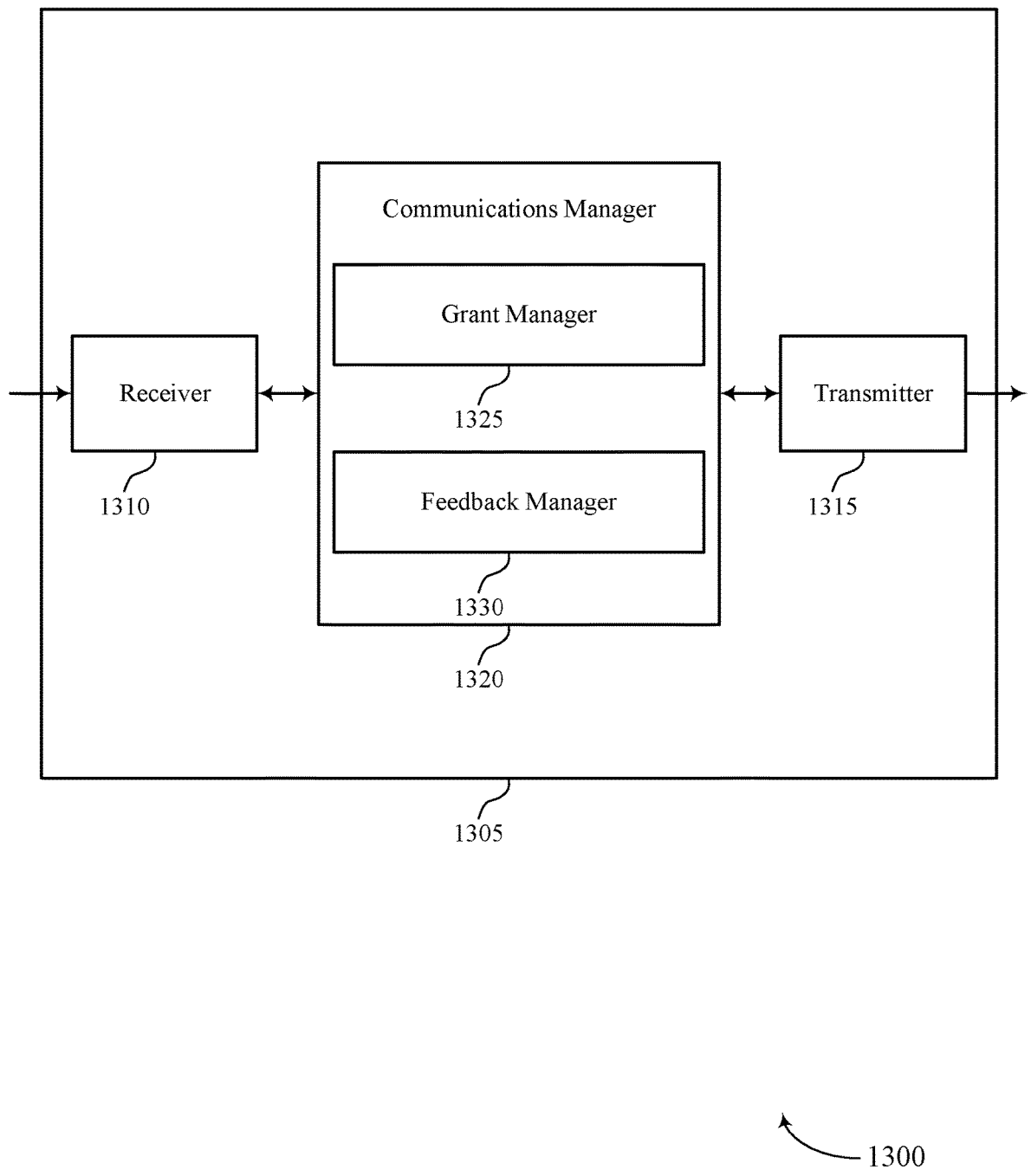

FIG. 13 shows a block diagram 1300 of a device 1305 that supports techniques for semi-static codebook design in accordance with one or more aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for semi-static codebook design). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for semi-static codebook design). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for semi-static codebook design as described herein. For example, the communications manager 1320 may include a grant manager 1325 a feedback manager 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a UE in accordance with examples as disclosed herein. The grant manager 1325 may be configured as or otherwise support a means for receiving, from a base station, one or more grants, a grant of the one or more grants scheduling a downlink transmission, one or more reference slots of the downlink transmission each corresponding to a respective offset value associated with a feedback occasion of one or more feedback occasions. The feedback manager 1330 may be configured as or otherwise support a means for transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

Figure 14:
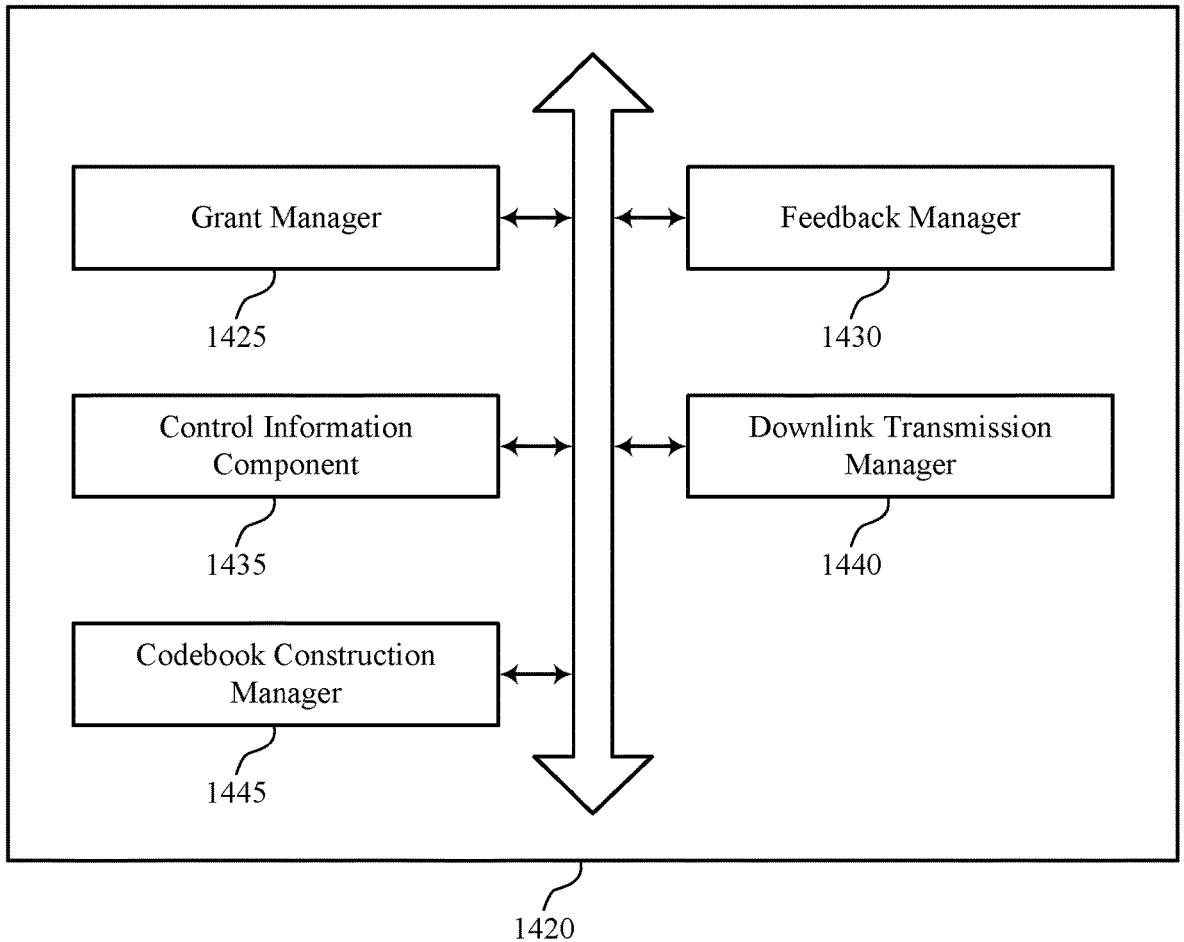
FIG. 14 shows a block diagram of a communications manager that supports techniques for semi-static codebook design in accordance with one or more aspects of the present disclosure.

FIG. 14 shows a block diagram 1400 of a communications manager 1420 that supports techniques for semi-static codebook design in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for semi-static codebook design as described herein. For example, the communications manager 1420 may include a grant manager 1425, a feedback manager 1430, a control information component 1435, a downlink transmission manager 1440, a codebook construction manager 1445, or any combination thereof. Each of these components may communicate, directly or indirectly, with one another (e.g., via one or more buses).

The communications manager 1420 may support wireless communications at a UE in accordance with examples as disclosed herein. The grant manager 1425 may be configured as or otherwise support a means for receiving, from a base station, one or more grants, a grant of the one or more grants scheduling a downlink transmission, one or more reference slots of the downlink transmission each corresponding to a respective offset value associated with a feedback occasion of one or more feedback occasions. The feedback manager 1430 may be configured as or otherwise support a means for transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

In some examples, the control information component 1435 may be configured as or otherwise support a means for receiving control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, where the size of the feedback codebook is further based on the received control information.

In some examples, the downlink transmission manager 1440 may be configured as or otherwise support a means for identifying the one or more configurable downlink transmissions based on the received control information, where the one or more configurable downlink transmissions include the downlink transmission.

In some examples, the one or more configurable downlink transmissions include one or more groups of slots, a respective last slot of each group of slots including a respective reference slot.

In some examples, the downlink transmission manager 1440 may be configured as or otherwise support a means for refraining from monitoring for a configurable downlink transmission including a first one or more groups of slots based on identifying a first indicator value associated with the configurable downlink transmission that overlaps with a first one or more symbols reserved for a first uplink transmission in a slot of the first one or more groups of slots of the configurable downlink transmission.

In some examples, the codebook construction manager 1445 may be configured as or otherwise support a means for initiating a set of slots, where the set of slots is initially empty. In some examples, the codebook construction manager 1445 may be configured as or otherwise support a means for identifying a reference slot of a second one or more reference slots based on the third quantity of configurable offset values and the feedback occasion. In some examples, the codebook construction manager 1445 may be configured as or otherwise support a means for updating the set of slots based on identifying the reference slot, where the updated set of slots include a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots. In some examples, the codebook construction manager 1445 may be configured as or otherwise support a means for generating a respective feedback bit for each slot of the updated set of slots, where the one or more feedback bits transmitted in the feedback occasion include the generated feedback bits.

In some examples, the downlink transmission manager 1440 may be configured as or otherwise support a means for identifying a first reference slot of a first group of slots of the downlink transmission based on receiving the grant, the first reference slot corresponding to a first offset value associated with the feedback occasion of the one or more feedback occasions, where the feedback occasion is a first feedback occasion. In some examples, the downlink transmission manager 1440 may be configured as or otherwise support a means for identifying a second reference slot of a second group of slots of the downlink transmission based on receiving the grant, the second reference slot corresponding to a second offset value associated with a second feedback occasion of the one or more feedback occasions.

In some examples, the codebook construction manager 1445 may be configured as or otherwise support a means for initiating a first set of slots and a second set of slots, where the first set of slots and the second set of slots are initially empty. In some examples, the codebook construction manager 1445 may be configured as or otherwise support a means for identifying a third reference slot of a second one or more reference slots based on the third quantity of configurable offset values and the first feedback occasion. In some examples, the codebook construction manager 1445 may be configured as or otherwise support a means for identifying a fourth reference slot of a third one or more reference slots based on the third quantity of configurable offset values and the second feedback occasion. In some examples, the codebook construction manager 1445 may be configured as or otherwise support a means for updating the first set of slots based on identifying the third reference slot, where the updated first set of slots include a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot is a last slot of the third group of slots of the first quantity of slots. In some examples, the codebook construction manager 1445 may be configured as or otherwise support a means for updating the second set of slots based on identifying the fourth reference slot, where the updated second set of slots include a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot is a last slot of the fourth group of slots of the first quantity of slots. In some examples, the codebook construction manager 1445 may be configured as or otherwise support a means for generating a first respective feedback bit for each slot of the updated first set of slots, where the first generated feedback bits are transmitted in the first feedback occasion. In some examples, the codebook construction manager 1445 may be configured as or otherwise support a means for generating a second respective feedback bit for each slot of the updated second set of slots, where the second generated feedback bits are transmitted in the second feedback occasion.

In some examples, the downlink transmission manager 1440 may be configured as or otherwise support a means for refraining from monitoring for a configurable downlink transmission in a first slot of a first group of slots of the configurable downlink transmission based on identifying a first indicator value associated with the configurable downlink transmission that overlaps with a first one or more symbols reserved for a first uplink transmission in the first slot of the first group of slots of the configurable downlink transmission.

In some examples, the codebook construction manager 1445 may be configured as or otherwise support a means for initiating a set of slots, where the set of slots is initially empty. In some examples, the codebook construction manager 1445 may be configured as or otherwise support a means for identifying a reference slot of a second one or more reference slots based on the third quantity of configurable offset values and the feedback occasion. In some examples, the codebook construction manager 1445 may be configured as or otherwise support a means for updating the set of slots based on identifying the reference slot, where the updated set of slots include a second group of slots of the first quantity of slots in the one or more configurable downlink transmissions and the identified reference slot is a last slot of the second group of slots of the first quantity of slots. In some examples, the codebook construction manager 1445 may be configured as or otherwise support a means for refraining from adding, to the updated set of slots, a second slot of the second group of slots of the first quantity of slots based on identifying a second indicator value associated with the one or more configurable downlink transmissions that overlaps with a second one or more symbols reserved for a second uplink transmission in the second slot of the second group of slots. In some examples, the codebook construction manager 1445 may be configured as or otherwise support a means for generating a respective feedback bit for each slot of the updated set of slots, where the one or more feedback bits transmitted in the feedback occasion include the generated feedback bits.

In some examples, the downlink transmission manager 1440 may be configured as or otherwise support a means for identifying a first reference slot of a second group of slots of the downlink transmission based on receiving the grant, the first reference slot corresponding to a first offset value associated with the feedback occasion of the one or more feedback occasions, where the feedback occasion is a first feedback occasion. In some examples, the downlink transmission manager 1440 may be configured as or otherwise support a means for identifying a second reference slot of a third group of slots of the downlink transmission based on receiving the grant, the second reference slot corresponding to a second offset value associated with a second feedback occasion of the one or more feedback occasions.

In some examples, the codebook construction manager 1445 may be configured as or otherwise support a means for initiating a first set of slots and a second set of slots, where the first set of slots and the second set of slots are initially empty. In some examples, the codebook construction manager 1445 may be configured as or otherwise support a means for identifying a third reference slot of a second one or more reference slots based on the third quantity of configurable offset values and the first feedback occasion. In some examples, the codebook construction manager 1445 may be configured as or otherwise support a means for identifying a fourth reference slot of a third one or more reference slots based on the third quantity of configurable offset values and the second feedback occasion. In some examples, the codebook construction manager 1445 may be configured as or otherwise support a means for updating the first set of slots based on identifying the third reference slot, where the updated first set of slots include a fourth group of slots of the first quantity of slots in the one or more configurable downlink transmissions and the identified third reference slot is a last slot of the fourth group of slots of the first quantity of slots. In some examples, the codebook construction manager 1445 may be configured as or otherwise support a means for updating the second set of slots based on identifying the fourth reference slot, where the updated second set of slots include a fifth group of slots of the first quantity of slots in the one or more configurable downlink transmissions and the identified fourth reference slot is a last slot of the fifth group of slots of the first quantity of slots. In some examples, the codebook construction manager 1445 may be configured as or otherwise support a means for refraining from adding, to the updated first set of slots, a second slot of the fourth group of slots of the first quantity of slots based on identifying a second indicator value associated with the one or more configurable downlink transmissions that overlaps with a second one or more symbols reserved for a second uplink transmission in the second slot of the fourth group of slots. In some examples, the codebook construction manager 1445 may be configured as or otherwise support a means for refraining from adding, to the updated second set of slots, a third slot of the fifth group of slots of the first quantity of slots based on identifying a third indicator value associated with the one or more configurable downlink transmissions that overlaps with a third one or more symbols reserved for a third uplink transmission in the third slot of the fifth group of slots. In some examples, the codebook construction manager 1445 may be configured as or otherwise support a means for generating a first respective feedback bit for each slot of the updated first set of slots, where the first generated feedback bits are transmitted in the first feedback occasion. In some examples, the codebook construction manager 1445 may be configured as or otherwise support a means for generating a second respective feedback bit for each slot of the updated second set of slots, where the second generated feedback bits are transmitted in the second feedback occasion.

Figure 15:
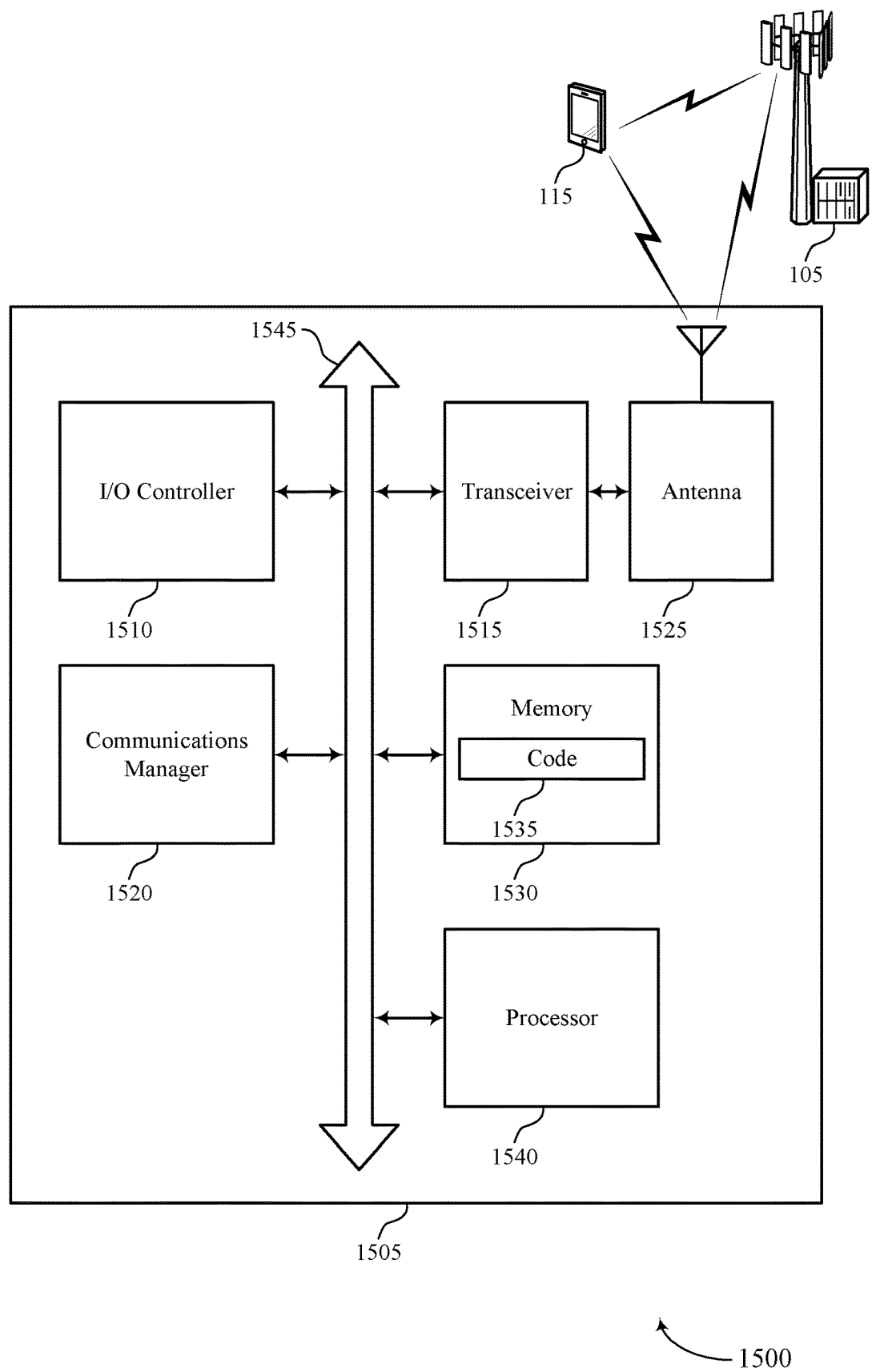
FIG. 15 shows a diagram of a system including a device that supports techniques for semi-static codebook design in accordance with one or more aspects of the present disclosure.

FIG. 15 shows a diagram of a system 1500 including a device 1505 that supports techniques for semi-static codebook design in accordance with one or more aspects of the present disclosure. The device 1505 may be an example of or include the components of a device 1205, a device 1305, or a UE 115 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device

1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for semi-static codebook design). For example, the device 1505 or a component of the device 1505 may include a processor 1540 and memory 1530 coupled to the processor 1540, the processor 1540 and memory 1530 configured to perform various functions described herein.

The communications manager 1520 may support wireless communications at a UE in accordance with examples as disclosed herein. For example, the communications manager 1520 may be configured as or otherwise support a means for receiving, from a base station, one or more grants, a grant of the one or more grants scheduling a downlink transmission, one or more reference slots of the downlink transmission each corresponding to a respective offset value associated with a feedback occasion of one or more feedback occasions. The communications manager 1520 may be configured as or otherwise support a means for transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

By including or configuring the communications manager 1520 in accordance with examples as described herein, the device 1505 may support techniques for saving power by communicating with base stations 105 (as shown in FIG. 1) in communications more efficiently. For example, the device 1505 may improve reliability in communications with base stations 105, as the device 1505 may be able to reliably generate feedback corresponding to granted downlink transmissions. Using the techniques described herein, the device 1505 may more accurately communicate with base stations 105, which may improve power efficiency at the device 1505.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for semi-static codebook design as described herein, or the processor 1540 and the memory 1530 may be otherwise configured to perform or support such operations.

Figure 16:
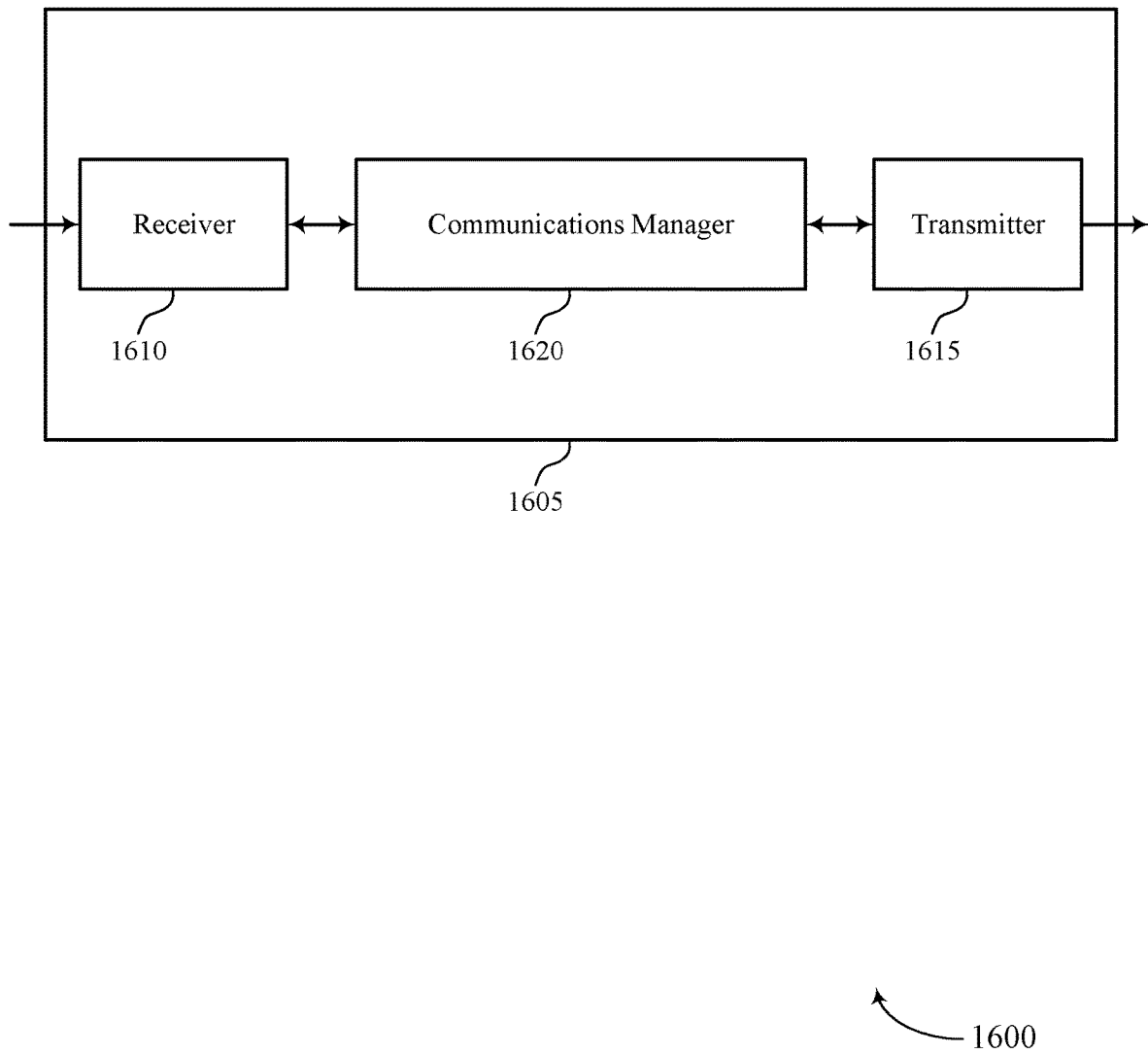
FIGS. 16 and 17 show block diagrams of devices that support techniques for semi-static codebook design in accordance with one or more aspects of the present disclosure.

FIG. 16 shows a block diagram 1600 of a device 1605 that supports techniques for semi-static codebook design in accordance with one or more aspects of the present disclosure. The device 1605 may be an example of aspects of a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for semi-static codebook design). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for semi-static codebook design). In some examples, the transmitter 1615 may be co-located with a receiver 1610 in a transceiver module. The transmitter 1615 may utilize a single antenna or a set of multiple antennas.

The communications manager 1620, the receiver 1610, the transmitter 1615, or various combinations thereof or various components thereof may be examples of means for performing various aspects of techniques for semi-static codebook design as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1620 may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a base station in accordance with examples as disclosed herein. For example, the communications manager 1620 may be configured as or otherwise support a means for transmitting, to a UE, one or more grants, a grant of the one or more grants scheduling a downlink transmission, one or more reference slots of the downlink transmission each corresponding to a respective offset value associated with a feedback occasion of one or more feedback occasions. The communications manager 1620 may be configured as or otherwise support a means for receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

By including or configuring the communications manager 1620 in accordance with examples as described herein, the device 1605 (e.g., a processor controlling or otherwise coupled to the receiver 1610, the transmitter 1615, the communications manager 1620, or a combination thereof) may support techniques for efficient utilization of communication resources. In some aspects, the processor of the device 1605 may adjust a size of a feedback codebook based on potential configurable downlink transmissions. For example, the processor of the device 1605 may turn on one or more processing units for feedback monitoring, increase a processing clock, or a similar mechanism within the device 1605. As such, when subsequent downlink transmissions are scheduled, the processor may more accurately monitor for corresponding feedback. Improvements in feedback transmission may result in improvements in power saving and communications reliability, which may further increase power efficiency at the device 1605 (e.g., by eliminating unnecessary repeated downlink transmissions).

Figure 17:
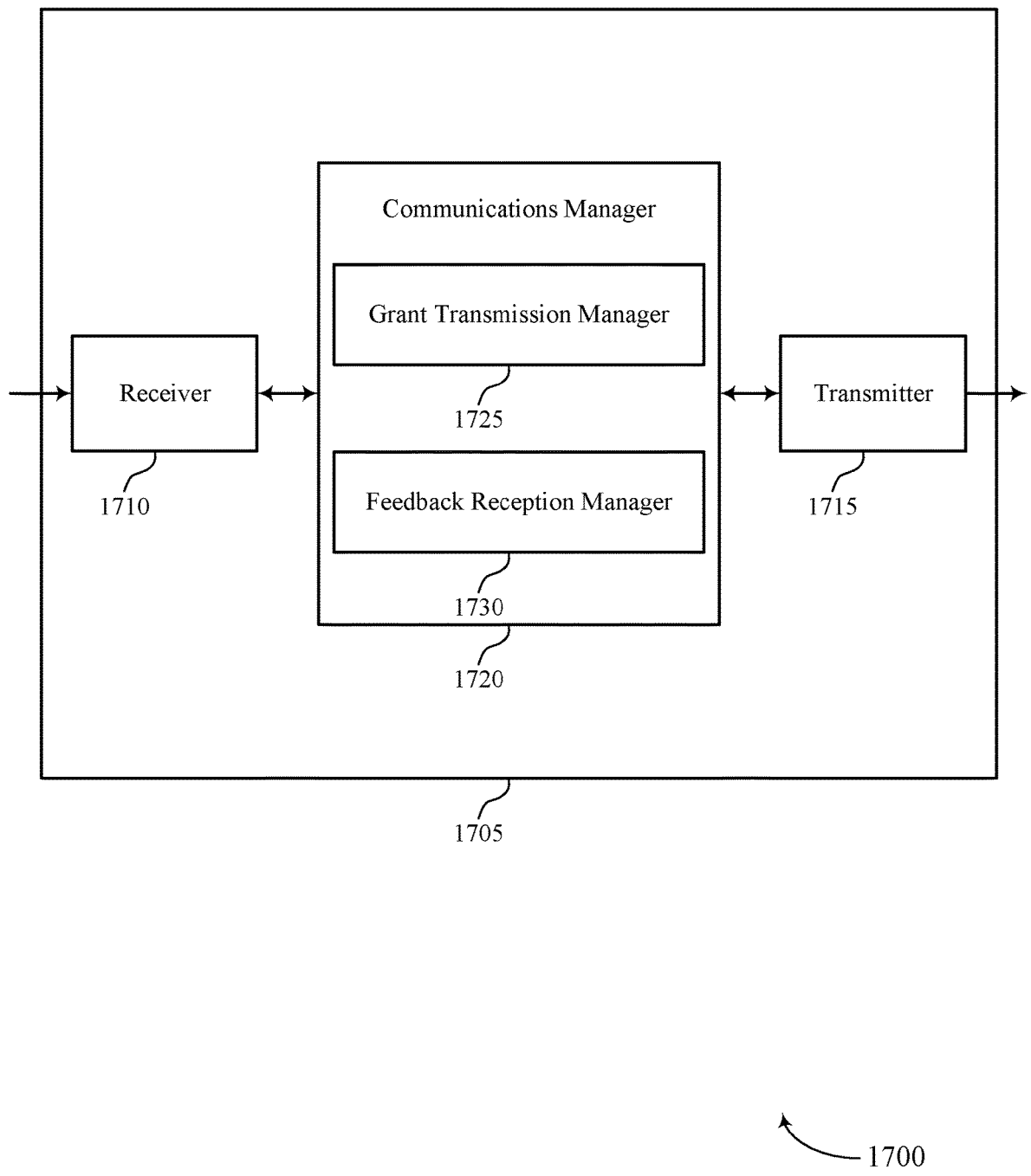

FIG. 17 shows a block diagram 1700 of a device 1705 that supports techniques for semi-static codebook design in accordance with one or more aspects of the present disclosure. The device 1705 may be an example of aspects of a device 1605 or a base station 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to techniques for semi-static codebook design). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to techniques for semi-static codebook design). In some examples, the transmitter 1715 may be co-located with a receiver 1710 in a transceiver module. The transmitter 1715 may utilize a single antenna or a set of multiple antennas.

The device 1705, or various components thereof, may be an example of means for performing various aspects of techniques for semi-static codebook design as described herein. For example, the communications manager 1720 may include a grant transmission manager 1725 a feedback reception manager 1730, or any combination thereof. The communications manager 1720 may be an example of aspects of a communications manager 1620 as described herein. In some examples, the communications manager 1720, or various components thereof, may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communications at a base station in accordance with examples as disclosed herein. The grant transmission manager 1725 may be configured as or otherwise support a means for transmitting, to a UE, one or more grants, a grant of the one or more grants scheduling a downlink transmission, one or more reference slots of the downlink transmission each corresponding to a respective offset value associated with a feedback occasion of one or more feedback occasions. The feedback reception manager 1730 may be configured as or otherwise support a means for receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

Figure 18:
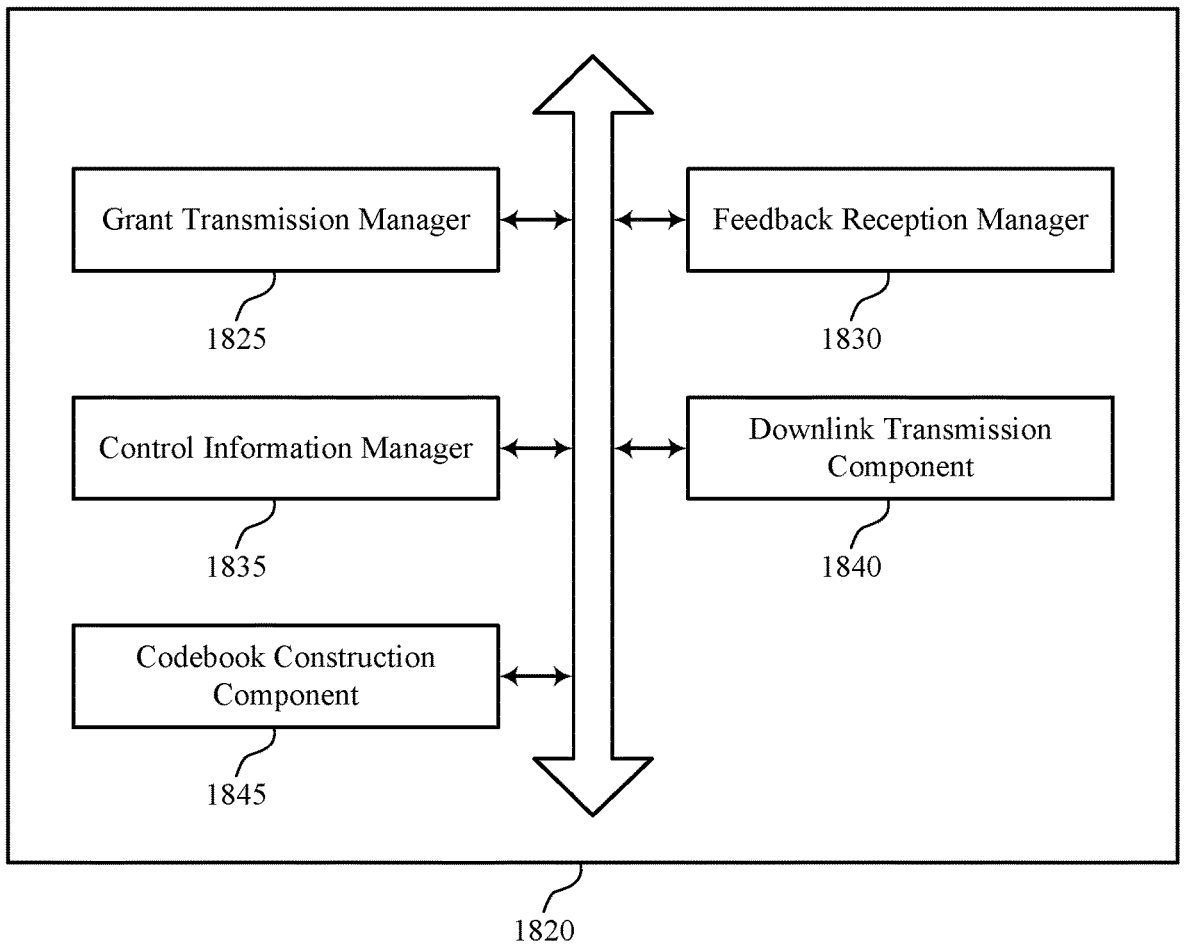
FIG. 18 shows a block diagram of a communications manager that supports techniques for semi-static codebook design in accordance with one or more aspects of the present disclosure.

FIG. 18 shows a block diagram 1800 of a communications manager 1820 that supports techniques for semi-static codebook design in accordance with aspects of the present disclosure. The communications manager 1820 may be an example of aspects of a communications manager 1620, a communications manager 1720, or both, as described herein. The communications manager 1820, or various components thereof, may be an example of means for performing various aspects of techniques for semi-static codebook design as described herein. For example, the communications manager 1820 may include a grant transmission manager 1825, a feedback reception manager 1830, a control information manager 1835, a downlink transmission component 1840, a codebook construction component 1845, or any combination thereof. Each of these components may communicate, directly or indirectly, with one another (e.g., via one or more buses).

The communications manager 1820 may support wireless communications at a base station in accordance with examples as disclosed herein. The grant transmission manager 1825 may be configured as or otherwise support a means for transmitting, to a UE, one or more grants, a grant of the one or more grants scheduling a downlink transmission, one or more reference slots of the downlink transmission each corresponding to a respective offset value associated with a feedback occasion of one or more feedback occasions. The feedback reception manager 1830 may be configured as or otherwise support a means for receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

In some examples, the control information manager 1835 may be configured as or otherwise support a means for transmitting control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, where the size of the feedback codebook is further based on the transmitted control information.

In some examples, the downlink transmission component 1840 may be configured as or otherwise support a means for identifying the one or more configurable downlink transmissions based on the transmitted control information, where the one or more configurable downlink transmissions include the downlink transmission.

In some examples, the downlink transmission includes one or more groups of slots, a respective last slot of each group of slots including a respective reference slot of the one or more reference slots.

In some examples, the downlink transmission component 1840 may be configured as or otherwise support a means for refraining from scheduling a configurable downlink transmission including a first one or more groups of slots based on identifying a first indicator value associated with the configurable downlink transmission that overlaps with a first one or more symbols reserved for a first uplink transmission in a slot of the first one or more groups of slots of the configurable downlink transmission.

In some examples, the codebook construction component 1845 may be configured as or otherwise support a means for initiating a set of slots, where the set of slots is initially empty. In some examples, the codebook construction component 1845 may be configured as or otherwise support a means for identifying a reference slot of a second one or more reference slots based on the third quantity of configurable offset values and the feedback occasion. In some examples, the codebook construction component 1845 may be configured as or otherwise support a means for updating the set of slots based on identifying the reference slot, where the updated set of slots include a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots. In some examples, the codebook construction component 1845 may be configured as or otherwise support a means for monitoring for a respective feedback bit for each slot of the updated set of slots, where receiving the one or more feedback bits in the feedback occasion is based on the monitoring.

In some examples, the downlink transmission component 1840 may be configured as or otherwise support a means for identifying a first reference slot of a first group of slots of the downlink transmission based on transmitting the grant, the first reference slot corresponding to a first offset value associated with the feedback occasion of the one or more feedback occasions, where the feedback occasion is a first feedback occasion. In some examples, the downlink transmission component 1840 may be configured as or otherwise support a means for identifying a second reference slot of a second group of slots of the downlink transmission based on transmitting the grant, the second reference slot corresponding to a second offset value associated with a second feedback occasion of the one or more feedback occasions.

In some examples, the codebook construction component 1845 may be configured as or otherwise support a means for initiating a first set of slots and a second set of slots, where the first set of slots and the second set of slots are initially empty. In some examples, the codebook construction component 1845 may be configured as or otherwise support a means for identifying a third reference slot of a second one or more reference slots based on the third quantity of configurable offset values and the first feedback occasion. In some examples, the codebook construction component 1845 may be configured as or otherwise support a means for identifying a fourth reference slot of a third one or more reference slots based on the third quantity of configurable offset values and the second feedback occasion. In some examples, the codebook construction component 1845 may be configured as or otherwise support a means for updating the first set of slots based on identifying the third reference slot, where the updated first set of slots include a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot is a last slot of the third group of slots of the first quantity of slots. In some examples, the codebook construction component 1845 may be configured as or otherwise support a means for updating the second set of slots based on identifying the fourth reference slot, where the updated second set of slots include a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot is a last slot of the fourth group of slots of the first quantity of slots. In some examples, the codebook construction component 1845 may be configured as or otherwise support a means for monitoring for a first respective feedback bit for each slot of the updated first set of slots, where a first one or more feedback bits are received in the first feedback occasion is based on the monitoring. In some examples, the codebook construction component 1845 may be configured as or otherwise support a means for monitoring for a second respective feedback bit for each slot of the updated second set of slots, where a second one or more feedback bits are received in the second feedback occasion is based on the monitoring.

In some examples, the downlink transmission component 1840 may be configured as or otherwise support a means for refraining from transmitting a configurable downlink transmission in a first slot of a first group of slots of the configurable downlink transmission based on identifying a first indicator value associated with the configurable downlink transmission that overlaps with a first one or more symbols reserved for a first uplink transmission in the first slot of the first group of slots of the configurable downlink transmission.

In some examples, the codebook construction component 1845 may be configured as or otherwise support a means for initiating a set of slots, where the set of slots is initially empty. In some examples, the codebook construction component 1845 may be configured as or otherwise support a means for identifying a reference slot of a second one or more reference slots based on the third quantity of configurable offset values and the feedback occasion. In some examples, the codebook construction component 1845 may be configured as or otherwise support a means for updating the set of slots based on identifying the reference slot, where the updated set of slots include a second group of slots of the first quantity of slots in the one or more configurable downlink transmissions and the identified reference slot is a last slot of the second group of slots of the first quantity of slots. In some examples, the codebook construction component 1845 may be configured as or otherwise support a means for refraining from adding, to the updated set of slots, a second slot of the second group of slots of the first quantity of slots based on identifying a second indicator value associated with the one or more configurable downlink transmissions that overlaps with a second one or more symbols reserved for a second uplink transmission in the second slot of the second group of slots. In some examples, the codebook construction component 1845 may be configured as or otherwise support a means for monitoring for a respective feedback bit for each slot of the updated set of slots, where receiving the one or more feedback bits in the feedback occasion is based on the monitoring.

In some examples, the downlink transmission component 1840 may be configured as or otherwise support a means for identifying a first reference slot of a second group of slots of the downlink transmission based on transmitting the grant, the first reference slot corresponding to a first offset value associated with the feedback occasion of the one or more feedback occasions, where the feedback occasion is a first feedback occasion. In some examples, the downlink transmission component 1840 may be configured as or otherwise support a means for identifying a second reference slot of a third group of slots of the downlink transmission based on transmitting the grant, the second reference slot corresponding to a second offset value associated with a second feedback occasion of the one or more feedback occasions.

In some examples, the codebook construction component 1845 may be configured as or otherwise support a means for initiating a first set of slots and a second set of slots, where the first set of slots and the second set of slots are initially empty. In some examples, the codebook construction component 1845 may be configured as or otherwise support a means for identifying a third reference slot of a second one or more reference slots based on the third quantity of configurable offset values and the first feedback occasion. In some examples, the codebook construction component 1845 may be configured as or otherwise support a means for identifying a fourth reference slot of a third one or more reference slots based on the third quantity of configurable offset values and the second feedback occasion. In some examples, the codebook construction component 1845 may be configured as or otherwise support a means for updating the first set of slots based on identifying the third reference slot, where the updated first set of slots include a fourth group of slots of the first quantity of slots in the one or more configurable downlink transmissions and the identified third reference slot is a last slot of the fourth group of slots of the first quantity of slots. In some examples, the codebook construction component 1845 may be configured as or otherwise support a means for updating the second set of slots based on identifying the fourth reference slot, where the updated second set of slots include a fifth group of slots of the first quantity of slots in the one or more configurable downlink transmissions and the identified fourth reference slot is a last slot of the fifth group of slots of the first quantity of slots. In some examples, the codebook construction component 1845 may be configured as or otherwise support a means for refraining from adding, to the updated first set of slots, a second slot of the fourth group of slots of the first quantity of slots based on identifying a second indicator value associated with the one or more configurable downlink transmissions that overlaps with a second one or more symbols reserved for a second uplink transmission in the second slot of the fourth group of slots. In some examples, the codebook construction component 1845 may be configured as or otherwise support a means for refraining from adding, to the updated second set of slots, a third slot of the fifth group of slots of the first quantity of slots based on identifying a third indicator value associated with the one or more configurable downlink transmissions that overlaps with a third one or more symbols reserved for a third uplink transmission in the third slot of the fifth group of slots. In some examples, the codebook construction component 1845 may be configured as or otherwise support a means for monitoring for a first respective feedback bit for each slot of the updated first set of slots, where a first one or more feedback bits are received in the first feedback occasion is based on the monitoring. In some examples, the codebook construction component 1845 may be configured as or otherwise support a means for monitoring for a second respective feedback bit for each slot of the updated second set of slots, where a second one or more feedback bits are received in the second feedback occasion is based on the monitoring.

Figure 19:
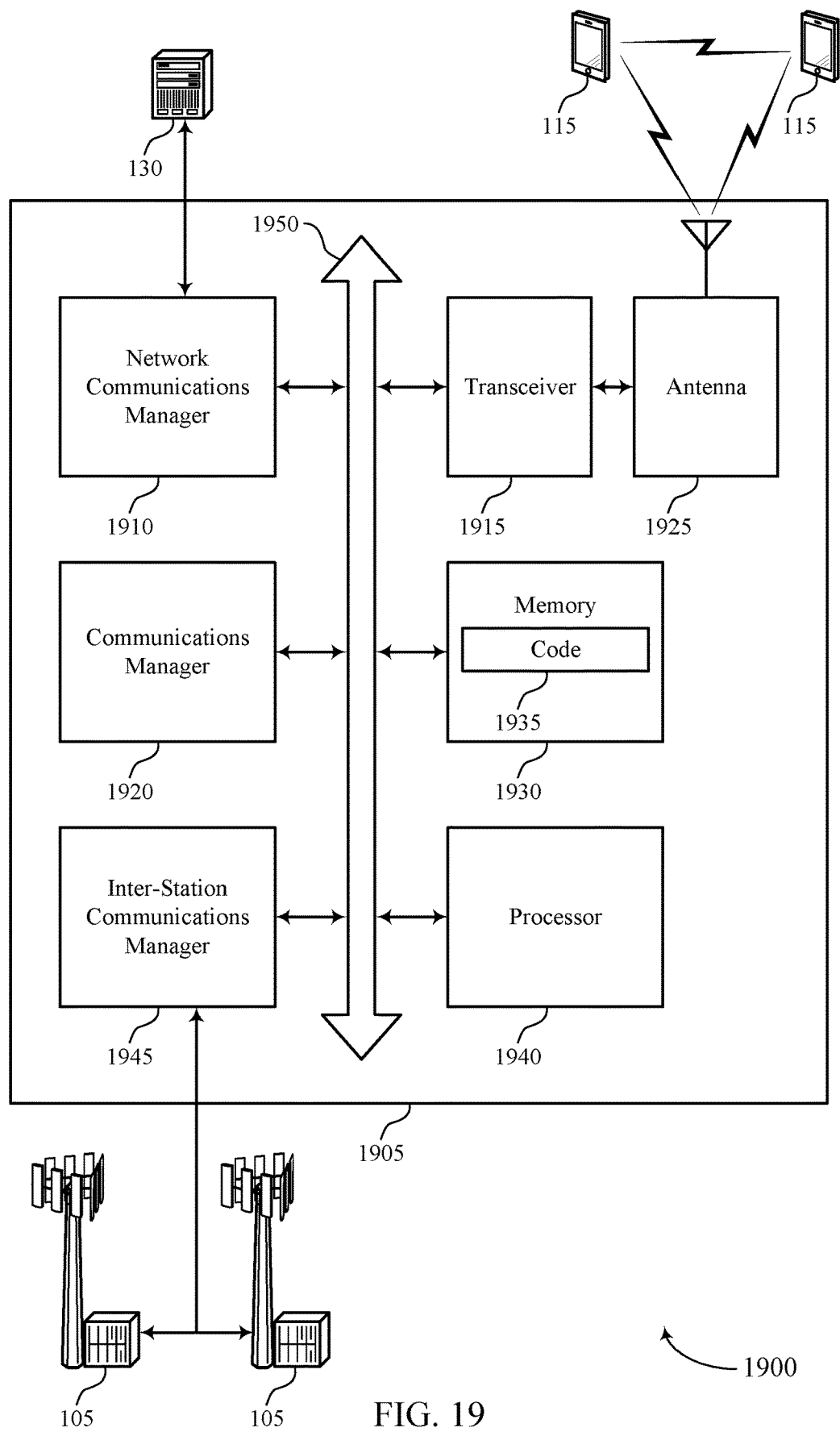
FIG. 19 shows a diagram of a system including a device that supports techniques for semi-static codebook design in accordance with one or more aspects of the present disclosure.

FIG. 19 shows a diagram of a system 1900 including a device 1905 that supports techniques for semi-static codebook design in accordance with one or more aspects of the present disclosure. The device 1905 may be an example of or include the components of a device 1605, a device 1705, or a base station 105 as described herein. The device 1905 may communicate wirelessly with one or more base stations 105, UEs 115, or any combination thereof. The device 1905 may include components for bi-directional voice and data communications including components for transmitting and receiving communications, such as a communications manager 1920, a network communications manager 1910, a transceiver 1915, an antenna 1925, a memory 1930, code 1935, a processor 1940, and an inter-station communications manager 1945. These components may be in electronic communication or otherwise coupled (e.g., operatively, communicatively, functionally, electronically, electrically) via one or more buses (e.g., a bus 1950).

The network communications manager 1910 may manage communications with a core network 130 (e.g., via one or more wired backhaul links). For example, the network communications manager 1910 may manage the transfer of data communications for client devices, such as one or more UEs 115.

In some cases, the device 1905 may include a single antenna 1925. However, in some other cases the device 1905 may have more than one antenna 1925, which may be capable of concurrently transmitting or receiving multiple wireless transmissions. The transceiver 1915 may communicate bi-directionally, via the one or more antennas 1925, wired, or wireless links as described herein. For example, the transceiver 1915 may represent a wireless transceiver and may communicate bi-directionally with another wireless transceiver. The transceiver 1915 may also include a modem to modulate the packets, to provide the modulated packets to one or more antennas 1925 for transmission, and to demodulate packets received from the one or more antennas 1925. The transceiver 1915, or the transceiver 1915 and one or more antennas 1925, may be an example of a transmitter 1615, a transmitter 1715, a receiver 1610, a receiver 1710, or any combination thereof or component thereof, as described herein.

The memory 1930 may include RAM and ROM. The memory 1930 may store computer-readable, computer-executable code 1935 including instructions that, when executed by the processor 1940, cause the device 1905 to perform various functions described herein. The code 1935 may be stored in a non-transitory computer-readable medium such as system memory or another type of memory. In some cases, the code 1935 may not be directly executable by the processor 1940 but may cause a computer (e.g., when compiled and executed) to perform functions described herein. In some cases, the memory 1930 may contain, among other things, a BIOS which may control basic hardware or software operation such as the interaction with peripheral components or devices.

The processor 1940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting techniques for semi-static codebook design). For example, the device 1905 or a component of the device 1905 may include a processor 1940 and memory 1930 coupled to the processor 1940, the processor 1940 and memory 1930 configured to perform various functions described herein.

The inter-station communications manager 1945 may manage communications with other base stations 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communications network technology to provide communication between base stations 105.

The communications manager 1920 may support wireless communications at a base station in accordance with examples as disclosed herein. For example, the communications manager 1920 may be configured as or otherwise support a means for transmitting, to a UE, one or more grants, a grant of the one or more grants scheduling a downlink transmission, one or more reference slots of the downlink transmission each corresponding to a respective offset value associated with a feedback occasion of one or more feedback occasions. The communications manager 1920 may be configured as or otherwise support a means for receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

By including or configuring the communications manager 1920 in accordance with examples as described herein, the device 1905 may support techniques for saving power by communicating with UEs 115 (as shown in FIG. 1) in downlink transmissions more efficiently. For example, the device 1905 may improve reliability in communications with UEs 115, as the device 1905 may be able to reliably receive feedback corresponding to granted downlink transmissions. Using the techniques described herein, the device 1905 may more accurately communicate with UEs 115, which may improve power efficiency at the device 1905.

In some examples, the communications manager 1920 may be configured to perform various operations (e.g., receiving, monitoring, transmitting) using or otherwise in cooperation with the transceiver 1915, the one or more antennas 1925, or any combination thereof. Although the communications manager 1920 is illustrated as a separate component, in some examples, one or more functions described with reference to the communications manager 1920 may be supported by or performed by the processor 1940, the memory 1930, the code 1935, or any combination thereof. For example, the code 1935 may include instructions executable by the processor 1940 to cause the device 1905 to perform various aspects of techniques for semi-static codebook design as described herein, or the processor 1940 and the memory 1930 may be otherwise configured to perform or support such operations.

Figure 20:
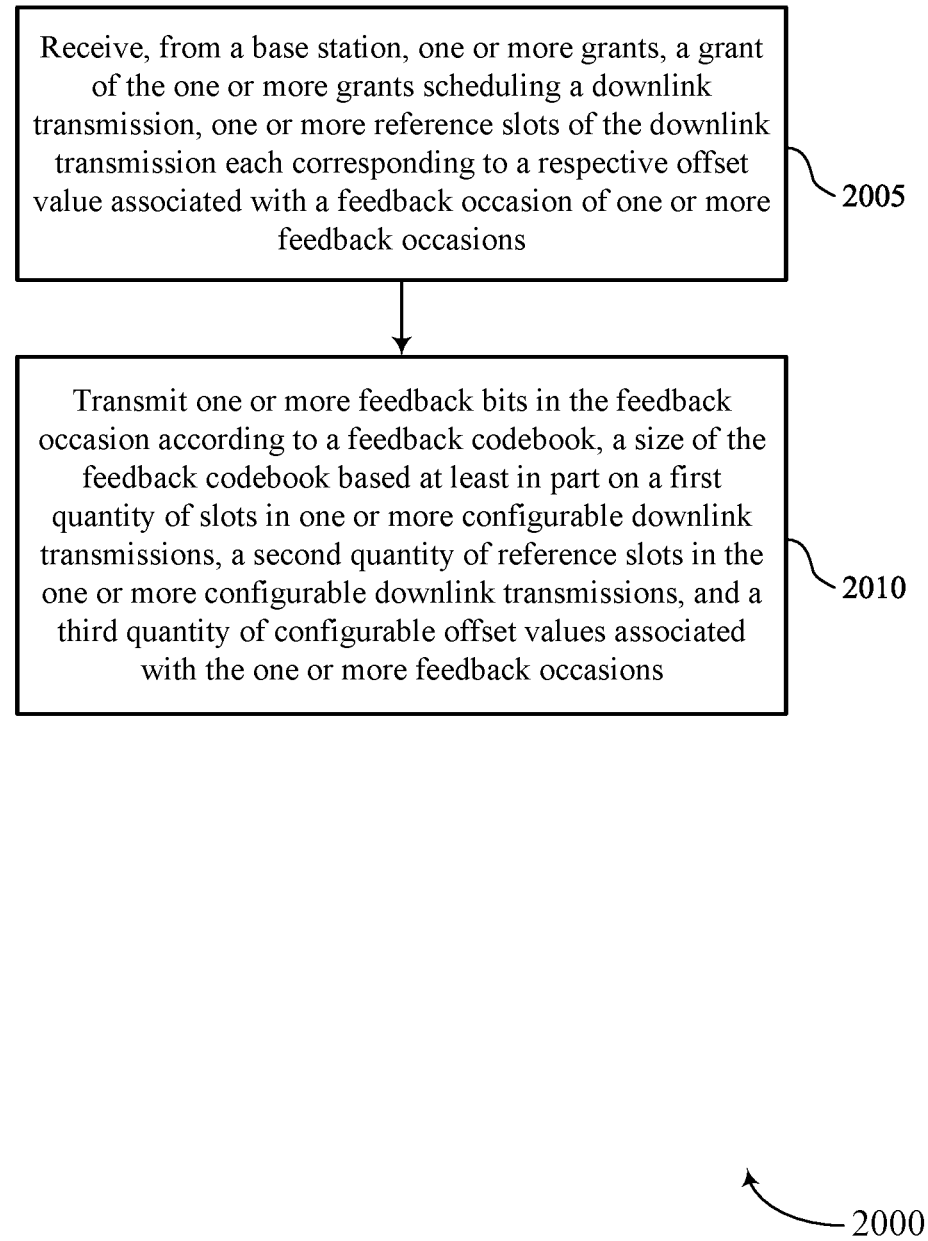
FIGS. 20 and 21 show flowcharts illustrating methods that support techniques for semi-static codebook design in accordance with one or more aspects of the present disclosure.

FIG. 20 shows a flowchart illustrating a method 2000 that supports techniques for semi-static codebook design in accordance with one or more aspects of the present disclosure. The operations of the method 2000 may be implemented by a UE or its components as described herein. For example, the operations of the method 2000 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, one or more grants, a grant of the one or more grants scheduling a downlink transmission, one or more reference slots of the downlink transmission each corresponding to a respective offset value associated with a feedback occasion of one or more feedback occasions. The operations of 2005 may be performed in accordance with examples as disclosed herein. In some examples, aspects of the operations of 2005 may be performed by a grant manager 1425 as described with reference to FIG. 14.

At 2010, the method may include transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions. The operations of 2010 may be performed in accordance with examples as disclosed herein. In some examples, aspects of the operations of 2010 may be performed by a feedback manager 1430 as described with reference to FIG. 14.

Figure 21:
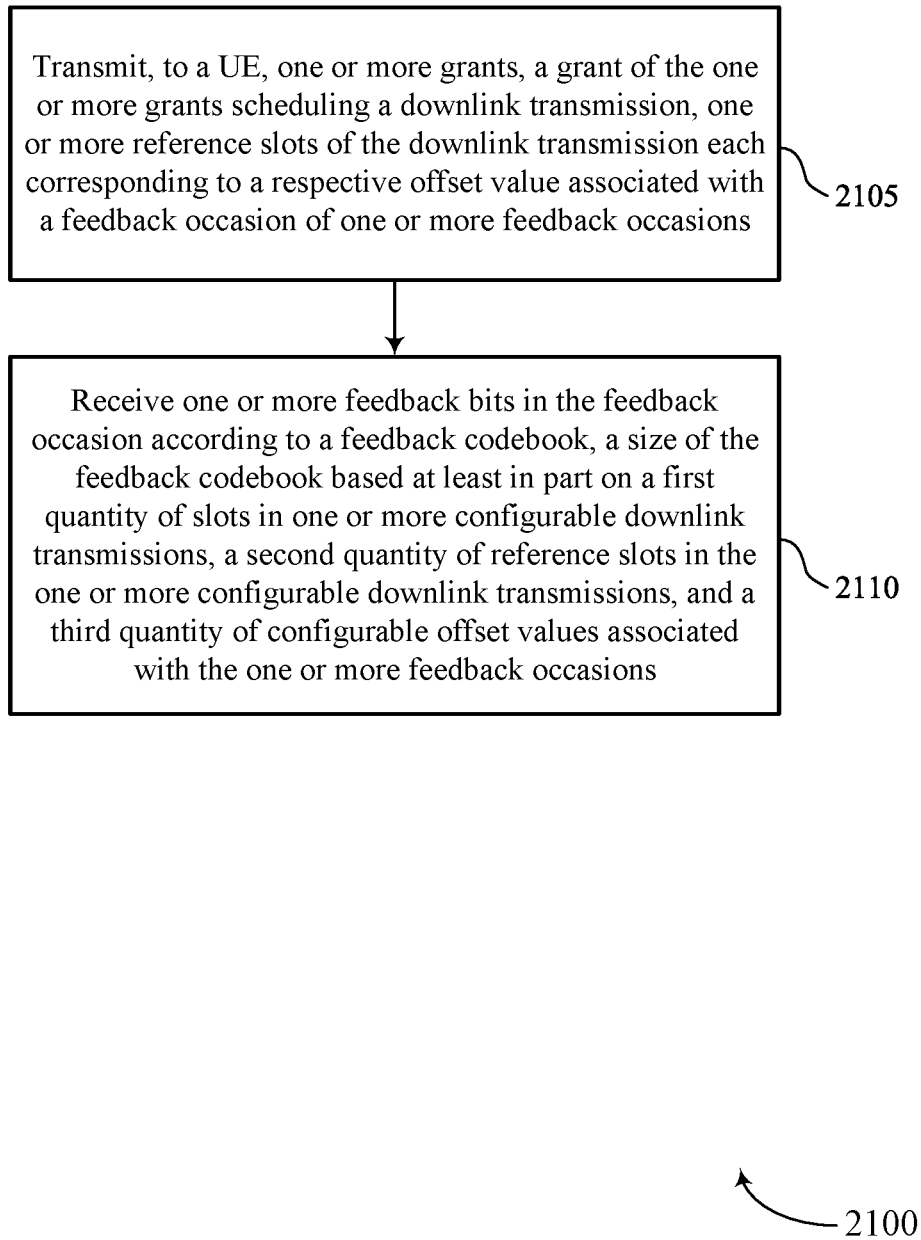

FIG. 21 shows a flowchart illustrating a method 2100 that supports techniques for semi-static codebook design in accordance with one or more aspects of the present disclosure. The operations of the method 2100 may be implemented by a base station or its components as described herein. For example, the operations of the method 2100 may be performed by a base station 105 as described with reference to FIGS. 1 through 11 and 16 through 19. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, one or more grants, a grant of the one or more grants scheduling a downlink transmission, one or more reference slots of the downlink transmission each corresponding to a respective offset value associated with a feedback occasion of one or more feedback occasions. The operations of 2105 may be performed in accordance with examples as disclosed herein. In some examples, aspects of the operations of 2105 may be performed by a grant transmission manager 1825 as described with reference to FIG. 18.

At 2110, the method may include receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions. The operations of 2110 may be performed in accordance with examples as disclosed herein. In some examples, aspects of the operations of 2110 may be performed by a feedback reception manager 1830 as described with reference to FIG. 18.

The following provides an overview of aspects of the present disclosure:

Aspect 1: A method for wireless communications at a UE, comprising: receiving, from a base station, one or more grants, a grant of the one or more grants scheduling a downlink transmission, one or more reference slots of the downlink transmission each corresponding to a respective offset value associated with a feedback occasion of one or more feedback occasions; and transmitting one or more feedback bits in the feedback occasion according to a feedback codebook, a size of the feedback codebook based at least in part on a first quantity of slots in one or more configurable downlink transmissions, a second quantity of reference slots in the one or more configurable downlink transmissions, and a third quantity of configurable offset values associated with the one or more feedback occasions.

Aspect 2: The method of aspect 1, further comprising: receiving control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, wherein the size of the feedback codebook is further based at least in part on the received control information.

Aspect 3: The method of aspect 2, further comprising: identifying the one or more configurable downlink transmissions based at least in part on the received control information, wherein the one or more configurable downlink transmissions comprise the downlink transmission.

Aspect 4: The method of any of aspects 1 through 3, wherein the one or more configurable downlink transmissions comprise one or more groups of slots, a respective last slot of each group of slots comprising a respective reference slot.

Aspect 5: The method of any of aspects 1 through 4, further comprising: refraining from monitoring for a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

Aspect 6: The method of aspect 5, further comprising: initiating a set of slots, wherein the set of slots is initially empty; identifying a reference slot of a second one or more reference slots based at least in part on the third quantity of configurable offset values and the feedback occasion; updating the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and generating a respective feedback bit for each slot of the updated set of slots, wherein the one or more feedback bits transmitted in the feedback occasion comprise the generated feedback bits.

Aspect 7: The method of aspect 5, further comprising: identifying a first reference slot of a first group of slots of the downlink transmission based at least in part on receiving the grant, the first reference slot corresponding to a first offset value associated with the feedback occasion of the one or more feedback occasions, wherein the feedback occasion is a first feedback occasion; and identifying a second reference slot of a second group of slots of the downlink transmission based at least in part on receiving the grant, the second reference slot corresponding to a second offset value associated with a second feedback occasion of the one or more feedback occasions.

Aspect 8: The method of aspect 7, further comprising: initiating a first set of slots and a second set of slots, wherein the first set of slots and the second set of slots are initially empty; identifying a third reference slot of a second one or more reference slots based at least in part on the third quantity of configurable offset values and the first feedback occasion; identifying a fourth reference slot of a third one or more reference slots based at least in part on the third quantity of configurable offset values and the second feedback occasion; updating the first set of slots based at least in part on identifying the third reference slot, wherein the updated first set of slots comprise a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot is a last slot of the third group of slots of the first quantity of slots; updating the second set of slots based at least in part on identifying the fourth reference slot, wherein the updated second set of slots comprise a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot is a last slot of the fourth group of slots of the first quantity of slots; generating a first respective feedback bit for each slot of the updated first set of slots, wherein the first generated feedback bits are transmitted in the first feedback occasion; and generating a second respective feedback bit for each slot of the updated second set of slots, wherein the second generated feedback bits are transmitted in the second feedback occasion.

Aspect 9: The method of any of aspects 1 through 4, further comprising: refraining from monitoring for a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

Aspect 10: The method of aspect 9, further comprising: initiating a set of slots, wherein the set of slots is initially empty; identifying a reference slot of a second one or more reference slots based at least in part on the third quantity of configurable offset values and the feedback occasion; updating the set of slots based at least in part on identifying the reference slot, wherein the updated set of slots comprise a second group of slots of the first quantity of slots in the one or more configurable downlink transmissions and the identified reference slot is a last slot of the second group of slots of the first quantity of slots; refraining from adding, to the updated set of slots, a second slot of the second group of slots of the first quantity of slots based at least in part on identifying a second indicator value associated with the one or more configurable downlink transmissions that overlaps with a second one or more symbols reserved for a second uplink transmission in the second slot of the second group of slots; and generating a respective feedback bit for each slot of the updated set of slots, wherein the one or more feedback bits transmitted in the feedback occasion comprise the generated feedback bits.

Aspect 11: The method of aspect 9, further comprising: identifying a first reference slot of a second group of slots of the downlink transmission based at least in part on receiving the grant, the first reference slot corresponding to a first offset value associated with the feedback occasion of the one or more feedback occasions, wherein the feedback occasion is a first feedback occasion; and identifying a second reference slot of a third group of slots of the downlink transmission based at least in part on receiving the grant, the second reference slot corresponding to a second offset value associated with a second feedback occasion of the one or more feedback occasions.

Aspect 12: The method of aspect 11, further comprising: initiating a first set of slots and a second set of slots, wherein the first set of slots and the second set of slots are initially empty; identifying a third reference slot of a second one or more reference slots based at least in part on the third quantity of configurable offset values and the first feedback occasion; identifying a fourth reference slot of a third one or more reference slots based at least in part on the third quantity of configurable offset values and the second feedback occasion; updating the first set of slots based at least in part on identifying the third reference slot, wherein the updated first set of slots comprise a fourth group of slots of the first quantity of slots in the one or more configurable downlink transmissions and the identified third reference slot is a last slot of the fourth group of slots of the first quantity of slots; updating the second set of slots based at least in part on identifying the fourth reference slot, wherein the updated second set of slots comprise a fifth group of slots of the first quantity of slots in the one or more configurable downlink transmissions and the identified fourth reference slot is a last slot of the fifth group of slots of the first quantity of slots; refraining from adding, to the updated first set of slots, a second slot of the fourth group of slots of the first quantity of slots based at least in part on identifying a second indicator value associated with the one or more configurable downlink transmissions that overlaps with a second one or more symbols reserved for a second uplink transmission in the second slot of the fourth group of slots; refraining from adding, to the updated second set of slots, a third slot of the fifth group of slots of the first quantity of slots based at least in part on identifying a third indicator value associated with the one or more configurable downlink transmissions that overlaps with a third one or more symbols reserved for a third uplink transmission in the third slot of the fifth group of slots; generating a first respective feedback bit for each slot of the updated first set of slots, wherein the first generated feedback bits are transmitted in the first feedback occasion; and generating a second respective feedback bit for each slot of the updated second set of slots, wherein the second generated feedback bits are transmitted in the second feedback occasion.

Aspect 13: A method for wireless communications at a base station, comprising: transmitting, to a UE, one or more grants, a grant of the one or more grants scheduling a downlink transmission, one or more reference slots of the downlink transmission each corresponding to a respective offset value associated with a feedback occasion of one or more feedback occasions; and receiving one or more feedback bits in the feedback occasion according to a feedback codebook, a size of the feedback codebook based at least in part on a first quantity of slots in one or more configurable downlink transmissions, a second quantity of reference slots in the one or more configurable downlink transmissions, and a third quantity of configurable offset values associated with the one or more feedback occasions.

Aspect 14: The method of aspect 13, further comprising: transmitting control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, wherein the size of the feedback codebook is further based at least in part on the transmitted control information.

Aspect 15: The method of aspect 14, further comprising: identifying the one or more configurable downlink transmissions based at least in part on the transmitted control information, wherein the one or more configurable downlink transmissions comprise the downlink transmission.

Aspect 16: The method of any of aspects 13 through 15, wherein the downlink transmission comprises one or more groups of slots, a respective last slot of each group of slots comprising a respective reference slot of the one or more reference slots.

Aspect 17: The method of any of aspects 13 through 16, further comprising: refraining from scheduling a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

Aspect 18: The method of aspect 17, further comprising: initiating a set of slots, wherein the set of slots is initially empty; identifying a reference slot of a second one or more reference slots based at least in part on the third quantity of configurable offset values and the feedback occasion; updating the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and monitoring for a respective feedback bit for each slot of the updated set of slots, wherein receiving the one or more feedback bits in the feedback occasion is based at least in part on the monitoring.

Aspect 19: The method of aspect 17, further comprising: identifying a first reference slot of a first group of slots of the downlink transmission based at least in part on transmitting the grant, the first reference slot corresponding to a first offset value associated with the feedback occasion of the one or more feedback occasions, wherein the feedback occasion is a first feedback occasion; and identifying a second reference slot of a second group of slots of the downlink transmission based at least in part on transmitting the grant, the second reference slot corresponding to a second offset value associated with a second feedback occasion of the one or more feedback occasions.

Aspect 20: The method of aspect 19, further comprising: initiating a first set of slots and a second set of slots, wherein the first set of slots and the second set of slots are initially empty; identifying a third reference slot of a second one or more reference slots based at least in part on the third quantity of configurable offset values and the first feedback occasion; identifying a fourth reference slot of a third one or more reference slots based at least in part on the third quantity of configurable offset values and the second feedback occasion; updating the first set of slots based at least in part on identifying the third reference slot, wherein the updated first set of slots comprise a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot is a last slot of the third group of slots of the first quantity of slots; updating the second set of slots based at least in part on identifying the fourth reference slot, wherein the updated second set of slots comprise a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot is a last slot of the fourth group of slots of the first quantity of slots; monitoring for a first respective feedback bit for each slot of the updated first set of slots, wherein a first one or more feedback bits are received in the first feedback occasion is based at least in part on the monitoring; and monitoring for a second respective feedback bit for each slot of the updated second set of slots, wherein a second one or more feedback bits are received in the second feedback occasion is based at least in part on the monitoring.

Aspect 21: The method of any of aspects 13 through 16, further comprising: refraining from transmitting a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

Aspect 22: The method of aspect 21, further comprising: initiating a set of slots, wherein the set of slots is initially empty; identifying a reference slot of a second one or more reference slots based at least in part on the third quantity of configurable offset values and the feedback occasion; updating the set of slots based at least in part on identifying the reference slot, wherein the updated set of slots comprise a second group of slots of the first quantity of slots in the one or more configurable downlink transmissions and the identified reference slot is a last slot of the second group of slots of the first quantity of slots; refraining from adding, to the updated set of slots, a second slot of the second group of slots of the first quantity of slots based at least in part on identifying a second indicator value associated with the one or more configurable downlink transmissions that overlaps with a second one or more symbols reserved for a second uplink transmission in the second slot of the second group of slots; and monitoring for a respective feedback bit for each slot of the updated set of slots, wherein receiving the one or more feedback bits in the feedback occasion is based at least in part on the monitoring.

Aspect 23: The method of aspect 21, further comprising: identifying a first reference slot of a second group of slots of the downlink transmission based at least in part on transmitting the grant, the first reference slot corresponding to a first offset value associated with the feedback occasion of the one or more feedback occasions, wherein the feedback occasion is a first feedback occasion; and identifying a second reference slot of a third group of slots of the downlink transmission based at least in part on transmitting the grant, the second reference slot corresponding to a second offset value associated with a second feedback occasion of the one or more feedback occasions.

Aspect 24: The method of aspect 23, further comprising: initiating a first set of slots and a second set of slots, wherein the first set of slots and the second set of slots are initially empty; identifying a third reference slot of a second one or more reference slots based at least in part on the third quantity of configurable offset values and the first feedback occasion; identifying a fourth reference slot of a third one or more reference slots based at least in part on the third quantity of configurable offset values and the second feedback occasion; updating the first set of slots based at least in part on identifying the third reference slot, wherein the updated first set of slots comprise a fourth group of slots of the first quantity of slots in the one or more configurable downlink transmissions and the identified third reference slot is a last slot of the fourth group of slots of the first quantity of slots; updating the second set of slots based at least in part on identifying the fourth reference slot, wherein the updated second set of slots comprise a fifth group of slots of the first quantity of slots in the one or more configurable downlink transmissions and the identified fourth reference slot is a last slot of the fifth group of slots of the first quantity of slots; refraining from adding, to the updated first set of slots, a second slot of the fourth group of slots of the first quantity of slots based at least in part on identifying a second indicator value associated with the one or more configurable downlink transmissions that overlaps with a second one or more symbols reserved for a second uplink transmission in the second slot of the fourth group of slots; refraining from adding, to the updated second set of slots, a third slot of the fifth group of slots of the first quantity of slots based at least in part on identifying a third indicator value associated with the one or more configurable downlink transmissions that overlaps with a third one or more symbols reserved for a third uplink transmission in the third slot of the fifth group of slots; monitoring for a first respective feedback bit for each slot of the updated first set of slots, wherein a first one or more feedback bits are received in the first feedback occasion is based at least in part on the monitoring; and monitoring for a second respective feedback bit for each slot of the updated second set of slots, wherein a second one or more feedback bits are received in the second feedback occasion is based at least in part on the monitoring.

Aspect 25: An apparatus for wireless communications at a UE, comprising: a processor; and memory coupled to the processor, the processor and memory configured to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a base station, comprising a processor; and memory coupled to the processor, the processor and memory configured to perform a method of any of aspects 13 through 24.

Aspect 29: An apparatus for wireless communications at a base station, comprising at least one means for performing a method of any of aspects 13 through 24.

Aspect 30: A non-transitory computer-readable medium storing code for wireless communications at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, one or more grants, a grant of the one or more grants scheduling a downlink transmission, one or more reference slots of the downlink transmission each corresponding to a respective offset value associated with a feedback occasion of one or more feedback occasions; and
   transmitting one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

2. The method of claim 1, further comprising:
   receiving control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, wherein the size of the feedback codebook is further based at least in part on the received control information.

3. The method of claim 2, further comprising:
   identifying the one or more configurable downlink transmissions based at least in part on the received control information, wherein the one or more configurable downlink transmissions comprise the downlink transmission.

4. The method of claim 1, wherein the one or more configurable downlink transmissions comprise one or more groups of slots, a last slot of each group of slots comprising a reference slot corresponding to a configurable offset value.

5. The method of claim 1, further comprising:
   refraining from monitoring for a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

6. The method of claim 5, further comprising:
   initiating a set of slots, wherein the set of slots is initially empty;
   identifying a reference slot of a second one or more reference slots based at least in part on the third quantity of configurable offset values and the feedback occasion;

updating the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and generating a respective feedback bit for each slot of the updated set of slots, wherein the one or more feedback bits transmitted in the feedback occasion comprise the generated feedback bits.

7. The method of claim 5, further comprising:

identifying a first reference slot of a first group of slots of the downlink transmission based at least in part on receiving the grant, the first reference slot corresponding to a first offset value associated with the feedback occasion of the one or more feedback occasions, wherein the feedback occasion is a first feedback occasion; and identifying a second reference slot of a second group of slots of the downlink transmission based at least in part on receiving the grant, the second reference slot corresponding to a second offset value associated with a second feedback occasion of the one or more feedback occasions.

8. The method of claim 7, further comprising:

initiating a first set of slots and a second set of slots, wherein the first set of slots and the second set of slots are initially empty;

identifying a third reference slot of a second one or more reference slots based at least in part on the third quantity of configurable offset values and the first feedback occasion;

identifying a fourth reference slot of a third one or more reference slots based at least in part on the third quantity of configurable offset values and the second feedback occasion;

updating the first set of slots based at least in part on identifying the third reference slot, wherein the updated first set of slots comprise a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot is a last slot of the third group of slots of the first quantity of slots;

updating the second set of slots based at least in part on identifying the fourth reference slot, wherein the updated second set of slots comprise a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot is a last slot of the fourth group of slots of the first quantity of slots;

generating a first respective feedback bit for each slot of the updated first set of slots, wherein the first generated feedback bits are transmitted in the first feedback occasion; and generating a second respective feedback bit for each slot of the updated second set of slots, wherein the second generated feedback bits are transmitted in the second feedback occasion.

9. The method of claim 1, further comprising:

refraining from monitoring for a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

10. The method of claim 9, further comprising:

initiating a set of slots, wherein the set of slots is initially empty;

identifying a reference slot of a second one or more reference slots based at least in part on the third quantity of configurable offset values and the feedback occasion;

updating the set of slots based at least in part on identifying the reference slot, wherein the updated set of slots comprise a second group of slots of the first quantity of slots in the one or more configurable downlink transmissions and the identified reference slot is a last slot of the second group of slots of the first quantity of slots;

refraining from adding, to the updated set of slots, a second slot of the second group of slots of the first quantity of slots based at least in part on identifying a second indicator value associated with the one or more configurable downlink transmissions that overlaps with a second one or more symbols reserved for a second uplink transmission in the second slot of the second group of slots; and generating a respective feedback bit for each slot of the updated set of slots, wherein the one or more feedback bits transmitted in the feedback occasion comprise the generated feedback bits.

11. The method of claim 9, further comprising:

identifying a first reference slot of a second group of slots of the downlink transmission based at least in part on receiving the grant, the first reference slot corresponding to a first offset value associated with the feedback occasion of the one or more feedback occasions, wherein the feedback occasion is a first feedback occasion; and identifying a second reference slot of a third group of slots of the downlink transmission based at least in part on receiving the grant, the second reference slot corresponding to a second offset value associated with a second feedback occasion of the one or more feedback occasions.

12. The method of claim 11, further comprising:

initiating a first set of slots and a second set of slots, wherein the first set of slots and the second set of slots are initially empty;

identifying a third reference slot of a second one or more reference slots based at least in part on the third quantity of configurable offset values and the first feedback occasion;

identifying a fourth reference slot of a third one or more reference slots based at least in part on the third quantity of configurable offset values and the second feedback occasion;

updating the first set of slots based at least in part on identifying the third reference slot, wherein the updated first set of slots comprise a fourth group of slots of the first quantity of slots in the one or more configurable downlink transmissions and the identified third reference slot is a last slot of the fourth group of slots of the first quantity of slots;

updating the second set of slots based at least in part on identifying the fourth reference slot, wherein the updated second set of slots comprise a fifth group of slots of the first quantity of slots in the one or more configurable downlink transmissions and the identified fourth reference slot is a last slot of the fifth group of slots of the first quantity of slots;

refraining from adding, to the updated first set of slots, a second slot of the fourth group of slots of the first quantity of slots based at least in part on identifying a second indicator value associated with the one or more configurable downlink transmissions that overlaps with a second one or more symbols reserved for a second uplink transmission in the second slot of the fourth group of slots;

refraining from adding, to the updated second set of slots, a third slot of the fifth group of slots of the first quantity of slots based at least in part on identifying a third indicator value associated with the one or more configurable downlink transmissions that overlaps with a third one or more symbols reserved for a third uplink transmission in the third slot of the fifth group of slots;

generating a first respective feedback bit for each slot of the updated first set of slots, wherein the first generated feedback bits are transmitted in the first feedback occasion; and generating a second respective feedback bit for each slot of the updated second set of slots, wherein the second generated feedback bits are transmitted in the second feedback occasion.

13. A method for wireless communications at a network entity, comprising:

transmitting one or more grants, a grant of the one or more grants scheduling a downlink transmission, one or more reference slots of the downlink transmission each corresponding to a respective offset value associated with a feedback occasion of one or more feedback occasions; and receiving one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

14. The method of claim 13, further comprising:

transmitting control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, wherein the size of the feedback codebook is further based at least in part on the transmitted control information.

15. The method of claim 14, further comprising:

identifying the one or more configurable downlink transmissions based at least in part on the transmitted control information, wherein the one or more configurable downlink transmissions comprise the downlink transmission.

16. The method of claim 13, wherein the downlink transmission comprises one or more groups of slots, a last slot of each group of slots comprising a reference slot of the one or more reference slots, the reference slot corresponding to a configurable offset value.

17. The method of claim 13, further comprising:

refraining from scheduling a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

18. The method of claim 17, further comprising:

initiating a set of slots, wherein the set of slots is initially empty;

identifying a reference slot of a second one or more reference slots based at least in part on the third quantity of configurable offset values and the feedback occasion;

updating the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and monitoring for a respective feedback bit for each slot of the updated set of slots, wherein receiving the one or more feedback bits in the feedback occasion is based at least in part on the monitoring.

19. The method of claim 17, further comprising:

identifying a first reference slot of a first group of slots of the downlink transmission based at least in part on transmitting the grant, the first reference slot corresponding to a first offset value associated with the feedback occasion of the one or more feedback occasions, wherein the feedback occasion is a first feedback occasion; and identifying a second reference slot of a second group of slots of the downlink transmission based at least in part on transmitting the grant, the second reference slot corresponding to a second offset value associated with a second feedback occasion of the one or more feedback occasions.

20. The method of claim 19, further comprising:

initiating a first set of slots and a second set of slots, wherein the first set of slots and the second set of slots are initially empty;

identifying a third reference slot of a second one or more reference slots based at least in part on the third quantity of configurable offset values and the first feedback occasion;

identifying a fourth reference slot of a third one or more reference slots based at least in part on the third quantity of configurable offset values and the second feedback occasion;

updating the first set of slots based at least in part on identifying the third reference slot, wherein the updated first set of slots comprise a third group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified third reference slot is a last slot of the third group of slots of the first quantity of slots;

updating the second set of slots based at least in part on identifying the fourth reference slot, wherein the updated second set of slots comprise a fourth group of slots of the first quantity of slots in the one or more configurable downlink transmissions, a third indicator value associated with the one or more configurable downlink transmissions does not overlap with a third one or more symbols reserved for a third uplink transmission in any slot of the one or more configurable downlink transmissions, and the identified fourth reference slot is a last slot of the fourth group of slots of the first quantity of slots;

monitoring for a first respective feedback bit for each slot of the updated first set of slots, wherein a first one or more feedback bits are received in the first feedback occasion is based at least in part on the monitoring; and monitoring for a second respective feedback bit for each slot of the updated second set of slots, wherein a second one or more feedback bits are received in the second feedback occasion is based at least in part on the monitoring.

21. The method of claim 13, further comprising:
refraining from transmitting a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

22. The method of claim 21, further comprising:
initiating a set of slots, wherein the set of slots is initially empty;

identifying a reference slot of a second one or more reference slots based at least in part on the third quantity of configurable offset values and the feedback occasion;

updating the set of slots based at least in part on identifying the reference slot, wherein the updated set of slots comprise a second group of slots of the first quantity of slots in the one or more configurable downlink transmissions and the identified reference slot is a last slot of the second group of slots of the first quantity of slots;

refraining from adding, to the updated set of slots, a second slot of the second group of slots of the first quantity of slots based at least in part on identifying a second indicator value associated with the one or more configurable downlink transmissions that overlaps with a second one or more symbols reserved for a second uplink transmission in the second slot of the second group of slots; and monitoring for a respective feedback bit for each slot of the updated set of slots, wherein receiving the one or more feedback bits in the feedback occasion is based at least in part on the monitoring.

23. The method of claim 21, further comprising:
identifying a first reference slot of a second group of slots of the downlink transmission based at least in part on transmitting the grant, the first reference slot corresponding to a first offset value associated with the feedback occasion of the one or more feedback occasions, wherein the feedback occasion is a first feedback occasion; and identifying a second reference slot of a third group of slots of the downlink transmission based at least in part on transmitting the grant, the second reference slot corresponding to a second offset value associated with a second feedback occasion of the one or more feedback occasions.

24. The method of claim 23, further comprising:
initiating a first set of slots and a second set of slots, wherein the first set of slots and the second set of slots are initially empty;

identifying a third reference slot of a second one or more reference slots based at least in part on the third quantity of configurable offset values and the first feedback occasion;

identifying a fourth reference slot of a third one or more reference slots based at least in part on the third quantity of configurable offset values and the second feedback occasion;

updating the first set of slots based at least in part on identifying the third reference slot, wherein the updated first set of slots comprise a fourth group of slots of the first quantity of slots in the one or more configurable downlink transmissions and the identified third reference slot is a last slot of the fourth group of slots of the first quantity of slots;

updating the second set of slots based at least in part on identifying the fourth reference slot, wherein the updated second set of slots comprise a fifth group of slots of the first quantity of slots in the one or more configurable downlink transmissions and the identified fourth reference slot is a last slot of the fifth group of slots of the first quantity of slots;

refraining from adding, to the updated first set of slots, a second slot of the fourth group of slots of the first quantity of slots based at least in part on identifying a second indicator value associated with the one or more configurable downlink transmissions that overlaps with a second one or more symbols reserved for a second uplink transmission in the second slot of the fourth group of slots;

refraining from adding, to the updated second set of slots, a third slot of the fifth group of slots of the first quantity of slots based at least in part on identifying a third indicator value associated with the one or more configurable downlink transmissions that overlaps with a third one or more symbols reserved for a third uplink transmission in the third slot of the fifth group of slots;

monitoring for a first respective feedback bit for each slot of the updated first set of slots, wherein a first one or more feedback bits are received in the first feedback occasion is based at least in part on the monitoring; and monitoring for a second respective feedback bit for each slot of the updated second set of slots, wherein a second one or more feedback bits are received in the second feedback occasion is based at least in part on the monitoring.

25. An apparatus for wireless communications at a user equipment (UE), comprising:
a processor; and
memory coupled to the processor, the processor configured to:
receive, from a network entity, one or more grants, a grant of the one or more grants scheduling a downlink transmission, one or more reference slots of the downlink transmission each corresponding to a respective offset value associated with a feedback occasion of one or more feedback occasions; and
transmit one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

26. The apparatus of claim 25, wherein the processor is further configured to:
receive control information identifying the first quantity of slots in the one or more configurable downlink transmissions, the second quantity of reference slots in the one or more configurable downlink transmissions, the third quantity of configurable offset values, a fourth quantity of configurable indicator values associated with the one or more configurable downlink transmissions, or any combination thereof, wherein the size of the feedback codebook is further based at least in part on the received control information.

27. The apparatus of claim 26, wherein the processor is further configured to:
identify the one or more configurable downlink transmissions based at least in part on the received control information, wherein the one or more configurable downlink transmissions comprise the downlink transmission.

28. The apparatus of claim 25, further comprising an antenna configured to receive, transmit, or both.

29. The apparatus of claim 25, wherein the processor is further configured to:
refrain from monitoring for a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

30. The apparatus of claim 29, wherein the processor is further configured to:
initiate a set of slots, wherein the set of slots is initially empty;
identify a reference slot of a second one or more reference slots based at least in part on the third quantity of configurable offset values and the feedback occasion;
update the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and
generate a respective feedback bit for each slot of the updated set of slots, wherein the one or more feedback bits transmitted in the feedback occasion comprise the generated feedback bits.

31. The apparatus of claim 25, wherein the processor is further configured to:
refrain from monitoring for a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

32. An apparatus for wireless communications at a network entity, comprising:
a processor; and
memory coupled to the processor, the processor configured to:
transmit one or more grants, a grant of the one or more grants scheduling a downlink transmission, one or more reference slots of the downlink transmission each corresponding to a respective offset value associated with a feedback occasion of one or more feedback occasions; and
receive one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

33. The apparatus of claim 32, further comprising an antenna array configured to transmit, receive, or both.

34. The apparatus of claim 32, wherein the processor is further configured to:
refrain from scheduling a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

35. The apparatus of claim 34, wherein the processor is further configured to:
initiate a set of slots, wherein the set of slots is initially empty;
identify a reference slot of a second one or more reference slots based at least in part on the third quantity of configurable offset values and the feedback occasion;
update the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and monitor for a respective feedback bit for each slot of the updated set of slots, wherein receiving the one or more feedback bits in the feedback occasion is based at least in part on the monitoring.

36. The apparatus of claim 32, wherein the processor is further configured to:
refrain from transmitting a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

37. A non-transitory computer-readable medium storing code for wireless communications at a user equipment (UE), the code comprising instructions executable by a processor to:
receive, from a network entity, one or more grants, a grant of the one or more grants scheduling a downlink transmission, one or more reference slots of the downlink transmission each corresponding to a respective offset value associated with a feedback occasion of one or more feedback occasions; and
transmit one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

38. The non-transitory computer-readable medium of claim 37, wherein the instructions are further executable by the processor to:
refrain from monitoring for a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

39. The non-transitory computer-readable medium of claim 38, wherein the instructions are further executable by the processor to:
initiate a set of slots, wherein the set of slots is initially empty;
identify a reference slot of a second one or more reference slots based at least in part on the third quantity of configurable offset values and the feedback occasion;
update the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and
generate a respective feedback bit for each slot of the updated set of slots, wherein the one or more feedback bits transmitted in the feedback occasion comprise the generated feedback bits.

40. The non-transitory computer-readable medium of claim 37, wherein the instructions are further executable by the processor to:
refrain from monitoring for a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

41. A non-transitory computer-readable medium storing code for wireless communications at a network entity, the code comprising instructions executable by a processor to:
transmit one or more grants, a grant of the one or more grants scheduling a downlink transmission, one or more reference slots of the downlink transmission each corresponding to a respective offset value associated with a feedback occasion of one or more feedback occasions; and
receive one or more feedback bits in the feedback occasion according to a feedback codebook, a size of the feedback codebook based on a first quantity of slots in one or more configurable downlink transmissions, a second quantity of reference slots in the one or more configurable downlink transmissions, and a third quantity of configurable offset values associated with the one or more feedback occasions.

42. The non-transitory computer-readable medium of claim 41, wherein the instructions are further executable by the processor to:
refrain from scheduling a configurable downlink transmission comprising a first one or more groups of slots based at least in part on identifying a first indicator value associated with the configurable downlink transmission that overlaps with a first one or more symbols reserved for a first uplink transmission in a slot of the first one or more groups of slots of the configurable downlink transmission.

43. The non-transitory computer-readable medium of claim 42, wherein the instructions are further executable by the processor to:
initiate a set of slots, wherein the set of slots is initially empty;
identify a reference slot of a second one or more reference slots based at least in part on the third quantity of configurable offset values and the feedback occasion;
update the set of slots based at least in part on identifying the reference slot, wherein the updated set of slots comprise a first group of slots of the first quantity of slots in the one or more configurable downlink transmissions, a second indicator value associated with the one or more configurable downlink transmissions does not overlap with a second one or more symbols reserved for a second uplink transmission in any slot of the one or more configurable downlink transmissions, and the identified reference slot is a last slot of the first group of slots of the first quantity of slots; and
monitor for a respective feedback bit for each slot of the updated set of slots, wherein receiving the one or more feedback bits in the feedback occasion is based at least in part on the monitoring.

44. The non-transitory computer-readable medium of claim 41, wherein the instructions are further executable by the processor to:
refrain from transmitting a configurable downlink transmission in a first slot of a first group of slots of the configurable downlink transmission based at least in part on identifying a first indicator value associated with the configurable downlink transmission that overlaps with a first one or more symbols reserved for a first uplink transmission in the first slot of the first group of slots of the configurable downlink transmission.

* * * * *